(12) United States Patent
Papillon et al.

(10) Patent No.: US 9,995,843 B2
(45) Date of Patent: Jun. 12, 2018

(54) METHODS AND SYSTEM FOR BLASTING VIDEO ANALYSIS

(71) Applicants: Bryan E. Papillon, Phoenixville, PA (US); Cameron K. McKenzie, Brisbane (AU); Igor Kharitonenko, Sydney (AU); Pavel Popov, Solon, OH (US); William Mckenzie Hillhouse, Brisbane (AU)

(72) Inventors: Bryan E. Papillon, Phoenixville, PA (US); Cameron K. McKenzie, Brisbane (AU); Igor Kharitonenko, Sydney (AU); Pavel Popov, Solon, OH (US); William Mckenzie Hillhouse, Brisbane (AU)

(73) Assignee: Austin Star Detonator Company, Cleveland, OH (US)

( * ) Notice: Subject to any disclaimer, the term of this patent is extended or adjusted under 35 U.S.C. 154(b) by 215 days.

(21) Appl. No.: 14/864,214

(22) Filed: Sep. 24, 2015

(65) Prior Publication Data
US 2016/0104295 A1 Apr. 14, 2016

Related U.S. Application Data

(60) Provisional application No. 62/062,179, filed on Oct. 10, 2014.

(51) Int. Cl.
*G06K 9/00* (2006.01)
*G01V 9/00* (2006.01)
(Continued)

(52) U.S. Cl.
CPC .............. *G01V 9/00* (2013.01); *G06T 7/11* (2017.01); *G06T 7/194* (2017.01); *G06T 7/246* (2017.01); *G06T 2207/10016* (2013.01); *G06T 2207/10024* (2013.01); *G06T 2207/20081* (2013.01); *G06T 2207/30241* (2013.01)

(58) Field of Classification Search
CPC . G06T 2207/10016; G06T 2207/10024; G06T 2207/20081; G06T 2207/30241; G06T 7/11; G06T 7/194; G06T 7/246
See application file for complete search history.

(56) References Cited

U.S. PATENT DOCUMENTS

| 2003/0156739 | A1* | 8/2003 | Hinton | G06T 7/62 382/109 |
| 2013/0152812 | A1* | 6/2013 | Brent | F42D 1/055 102/312 |
| 2015/0078653 | A1* | 3/2015 | Tafazoli Bilandi | G06K 9/4604 382/154 |

OTHER PUBLICATIONS

A Model for the Determination of Flyrock Range as a Function of Shot Conditions, Roth et al., Management Science Associates (MSA), Apr. 1979, pp. 1-66.*
(Continued)

*Primary Examiner* — Vu Le
*Assistant Examiner* — Guillermo Rivera-Martinez
(74) *Attorney, Agent, or Firm* — Fay Sharpe LLP

(57) ABSTRACT

Blasting video analysis techniques and systems are presented using vibration compensated background analysis with automated determination of blast origin coordinates and highest point coordinates using blast outline coordinates for post-origin frames. Blast expansion trajectories of the highest particle are estimated in frames preceding the highest point frame, and estimated blast parameters including maximum height and initial blast velocity are computed independent of blast data.

17 Claims, 17 Drawing Sheets

(51) Int. Cl.
  *G06T 7/11* (2017.01)
  *G06T 7/246* (2017.01)
  *G06T 7/194* (2017.01)

(56) References Cited

OTHER PUBLICATIONS

Particle Tracking with ProAnalyst, Xcitex Inc., Feb. 2012, Document 164, pp. 1-10.*
Stabilizing a Shaking or Vibrating Video with ProAnalyst, Xcitex Inc., Feb. 2012, Document 164, pp. 1-10.*
Real Time based Fire & Smoke Detection without Sensor by Image Processing, Pagar et al., 2013, vol. 2, Issue-6, 2278-8948, pp. 25-34.*
Tips, "Motion Detection Using OpenCV", retrieved from the Internet Oct. 7, 2014, http://sundararajana.blogspot.com/2007/05/motion-detection-using-opencv.html, May 22, 2007, 13 pgs.
Bradski et al., "Learning OpenCV", "Chapter 9: Image Parts and Segmentation"; O'Reilly Media, Sep. 2008, 12 pgs.
Kahn et al., "Object Based Segmentation of Video Using Color, Motion and Spatial Information", IEEE 2001, pp. 746-751.
Bohush et al., "Smoke and Flame Detection in Video Sequences Based on Static and Dynamic Features", IEEE, Signal Processing Algorithms, Architectures, Arrangements and Applications, SPA 2013; Sep. 26-28, 2013; Poznan, Poland; pp. 20-25.
Gubbi et al., "Smoke Detection in Video Using Wavelets and Support Vector Machines", Fire Safety Journal (2009), doi: 10.1016/J.firesaf.2009.08.003; 6 pgs.
Liu, "The Application of High Speed Video System for Blasting Research", International Society of Explosives Engineers, 1994g—The Application of High Speed Video System for Blasting Research—pp. 359-273; 2000; pp. 1-15.
Giltner et al., "Blast Monitoring Using High Speed Video Research Equipment", International Society of Explosives Engineers; 1986g—Blast Monitoring Using High Speed Video Research Equipment—pp. 178-190; 2000; pp. 1-13.
Ferrari et al., "Real-Time Detection of Steam in Video Images", Science Direct (2006), doi: 10.1016/j.patcog.2006.07.007; 12 pgs.
Kim, et al., "Real-Time Foreground-Background Segmentation Using Codebook Model", Real-Time Imaging, vol. 11, No. (3); 2005; pp. 167-256.
Deori et al., "A Survey on Moving Object Tracking in Video", International Journal on Information Theory, vol. 3, No. 3; Jul. 2014; pp. 31-46.
Yilmaz et al., "Object Tracking: A Survey", ACM Computing Surveys, vol. 38, No. 4, Article 13; Dec. 2006, pp. 1-45.
Wang et al., "Adaptive Spatiotemporal Background Modeling", Institution of Engineering and Technology, vol. 6, Iss. 5; 2012; pp. 451-458.
McKenzie, "Flyrock Range & Fragment Size Prediction", International Society of Explosives Engineers, 2009G vol. 2, Proceedings of the 35th Annual Conf. on Explosives and Blasting Technique, Denver, CO, Feb. 2009, pp. 1-17.

* cited by examiner

| FRAME | X AXIS PIXEL COLUMN NUMBER | HIGHEST ROW NUMBER WITH FOREGROUND PIXEL |
|---|---|---|
| F0+1 | 0 | 0 |
| F0+1 | 1 | 0 |
| F0+1 | 2 | 0 |
| F0+1 | i-2 | 73 |
| F0+1 | i-1 | 87 |
| F0+1 | i | 95 |
| F0+1 | i+1 | 89 |
| F0+1 | i+2 | 85 |
| F0+1 | J-2 | 0 |
| F0+1 | J-1 | 0 |
| F0+1 | j | 0 |

| | 72 | 74 | 76 |
|---|---|---|---|
| 70 | FRAME | X AXIS PIXEL COLUMN NUMBER | HIGHEST ROW NUMBER WITH FOREGROUND PIXEL |
| | FH | 0 | 0 |
| | ⋮ | ⋮ | ⋮ |
| | FH | i-6 | 141 |
| | FH | i-5 | 147 | ← YH
| XH → | FH | i-4 | 138 |
| | FH | i-3 | 131 |
| | FH | i-2 | 122 |
| | FH | i-1 | 112 |
| | FH | i | 121 |
| X0 → | FH | i+1 | 126 |
| | FH | i+2 | 130 |
| | ⋮ | ⋮ | ⋮ |
| | FH | J-2 | 0 |
| | FH | J-1 | 0 |
| | FH | j | 0 |

*frame_H-2*

*frame_H-3*

METHODS AND SYSTEM FOR BLASTING VIDEO ANALYSIS

The present application claims priority to and the benefit of U.S. Provisional Patent Application No. 62/062,179, filed Oct. 10, 2014 and entitled METHODS AND SYSTEM FOR BLASTING VIDEO ANALYSIS, the entirety of which is hereby incorporated by reference.

BACKGROUND AND INCORPORATION BY REFERENCE

Blasting is used in the recovery of mineral resources, including in surface mining and quarrying for rock fragmentation and displacement of the broken rock. However, if the process is not organized properly, the rock fragments may be thrown beyond the expected limits that may result in accidents including critical injuries, or fatalities. An efficient preventive measure is the blasting process improvement that relies on the on-site video recording, storage, automatic analysis and classification of the recorded blasts followed by the automatic generation of reports. Although automatic video analysis is commonly used in many application areas such as video surveillance, traffic monitoring and robotics, the algorithms that have been developed to recognize and track solid objects with well defined shapes, textures and colors, are not efficient to deal with blasts which by their nature have dynamically changing shapes, colors and textures. Moreover, strong camera vibration caused by blasts will badly affect performance of conventional computer vision algorithms.

Scott G. Giltner, Paul N. Worsey, Blast Monitoring using High Speed Video Research Equipment, International Society of Explosives Engineers, 2000, pp. 178-190 describes a blast examination method that uses a motion analysis system designed to research various high speed processes and a computer program. To reduce the vibration effect, the camera tripod is set on several inches of foam rubber. The camera set up also requires several blast markers which are used to convert the camera units of measurements into feet. Trajectories and velocities of particles are measured manually through tracking them with the reticle. The reticle coordinates are used to plot out the trajectory of the particles for further analysis. Thus, the process of blast analysis and parameter estimation is not fully automatic and even manually it is not possible without the markers. Although efficiency of the camera vibration reduction is not reported, the use of a foam rubber mat placed under the camera tripod can hardly eliminate strong vibration caused by blasts. Also, it makes the camera set up process less practical for the industrial use.

Qian Liu, The Application of High Speed Video System for Blasting Research, International Society of Explosives Engineers, 2000, pp. 359-373 describes a blast monitoring method that uses a high speed video system Motion Analyzer that is capable of recording at various frame rates, and is incorporated herein by reference. Recorded videos are used to draw contours of stemming ejections. The blast analysis process is not automatic and therefore it is time consuming.

J. Gubbi, et al., Smoke detection in video using wavelets and support vector machines, Fire Safety Journal, 2009 describes a video based fire detection method that uses multi level Wavelet decomposition of video frames. Each video frame is subdivided into blocks of 32×32 pixels, and is incorporated herein by reference. Then, every block is checked for the presence of smoke. The architecture is based on a standard pattern recognition approach with preprocessing, feature extraction and classification sub-units with training and testing phases. The proposed method can detect smoke, but the described block based solution cannot be used for tracking of high speed particles. Also, the described method cannot differentiate clouds of smoke produced by explosive materials from dust clouds.

R. J. Ferrari, H. Zhang, C. R. Kube, Real-time detection of steam in video images, Pattern Recognition 40 (3) (2007) 1148-1159 describes a block based image processing method for steam detection in oil sand mines, and is incorporated herein by reference. The method uses Wavelet transform and Hidden Markov Model for feature extraction and support vector machines for classification. The solution is based on the assumption that the presence of steam acts as a blurring process, which changes the local texture pattern of an image while reducing the amount of details. In general, this assumption is suitable for only very limited types of blasts.

G Bradski, A. Kaehler, Learning OpenCV, O'Relly, 2008, pp. 276 and 278-285 is hereby incorporated herein by reference.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Instead, the primary purpose of this summary is to present some concepts of the disclosure in a simplified form prior to the more detailed description that is presented hereinafter.

Blasting video analysis (BVA) techniques and systems are provided using vibration compensated background analysis with automated determination of blast origin coordinates and highest point coordinates using blast outline coordinates for post-origin frames. Blast expansion trajectories of the highest particle are estimated in frames preceding the highest point frame, and estimated blast parameters including maximum height and initial blast velocity are computed independent of blast data. In certain embodiments, background analysis for segmenting frame data into foreground and background binary image data is performed using vibration modeling to accommodate vibration of source video equipment during blasting. In certain embodiments, moreover, video analysis is performed to identify toxic smoke in a blasting event based on video data.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
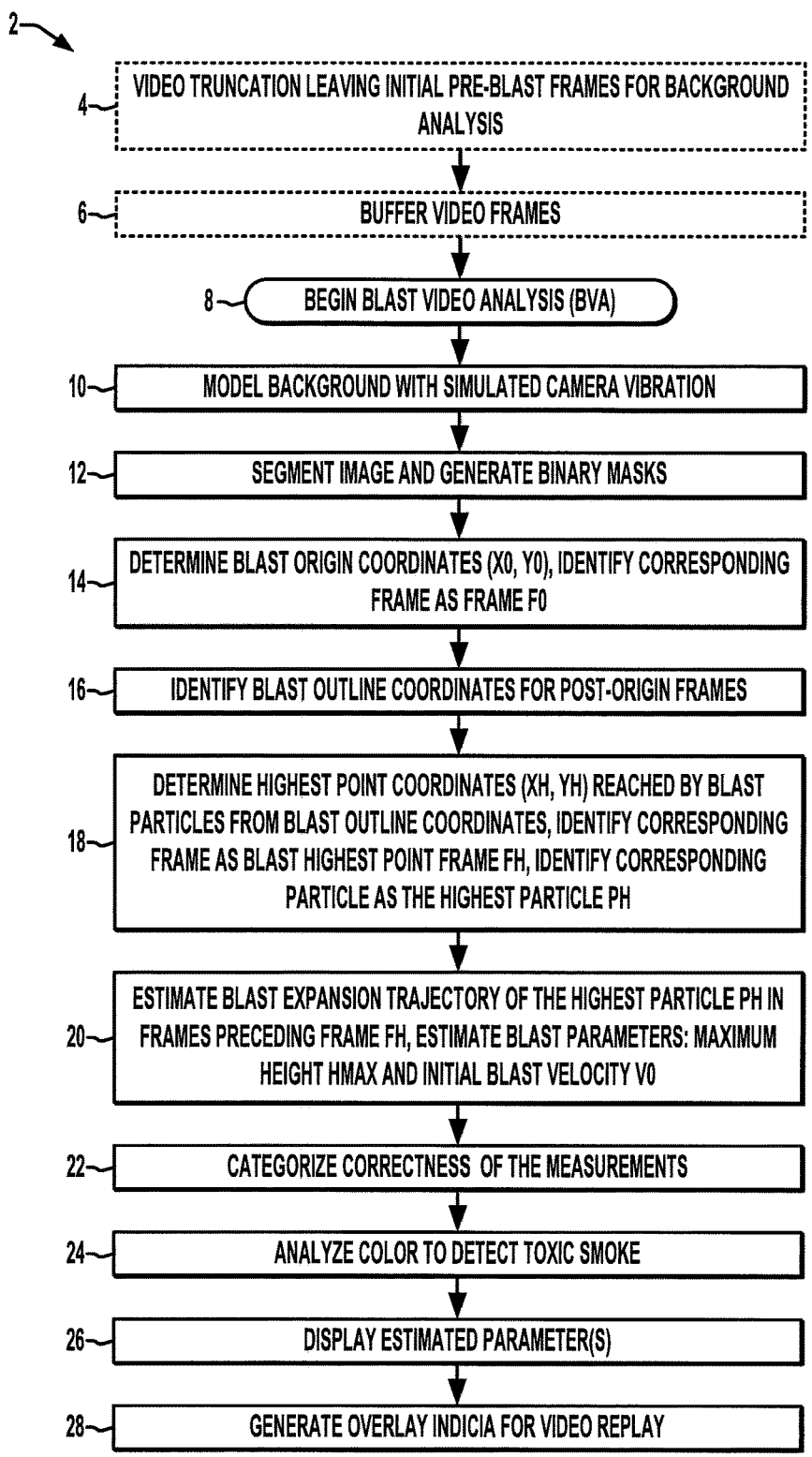
FIG. 1 is a flow diagram illustrating a method for analyzing blasting video data including estimation of a blast expansion trajectory of a highest particle.

Referring now to the figures, several embodiments or implementations of the present disclosure are hereinafter described in conjunction with the drawings, wherein like reference numerals are used to refer to like elements throughout, and wherein the various features and plots are not necessarily drawn to scale.

The disclosure relates to blasting video analysis methods and systems for use in various applications including without limitation industrial blasting and safety of explosions in particular, and may form part of an integrated solution that combines several stages such as blast video recording, automatic analysis of the recorded video sequences and automatic measurement of the blast parameters, automatic generation of reports and storage of video sequences and generated reports in a database. The techniques of the present disclosure may be employed in association with video obtained without a high speed video camera, and can instead employ a conventional consumer digital video camera. In addition, the blast video recording process does not require the use of surface markers, or range poles, or any objects of a pre-defined size to determine the distance to blasts from the camera, or height of the blast cloud instead relying solely on video data independent of other blast data which may or may not be available. Moreover, blast analysis and parameter measurement is fully automatic and is carried out using only recorded video sequences as source data in certain embodiments.

Figure 2:
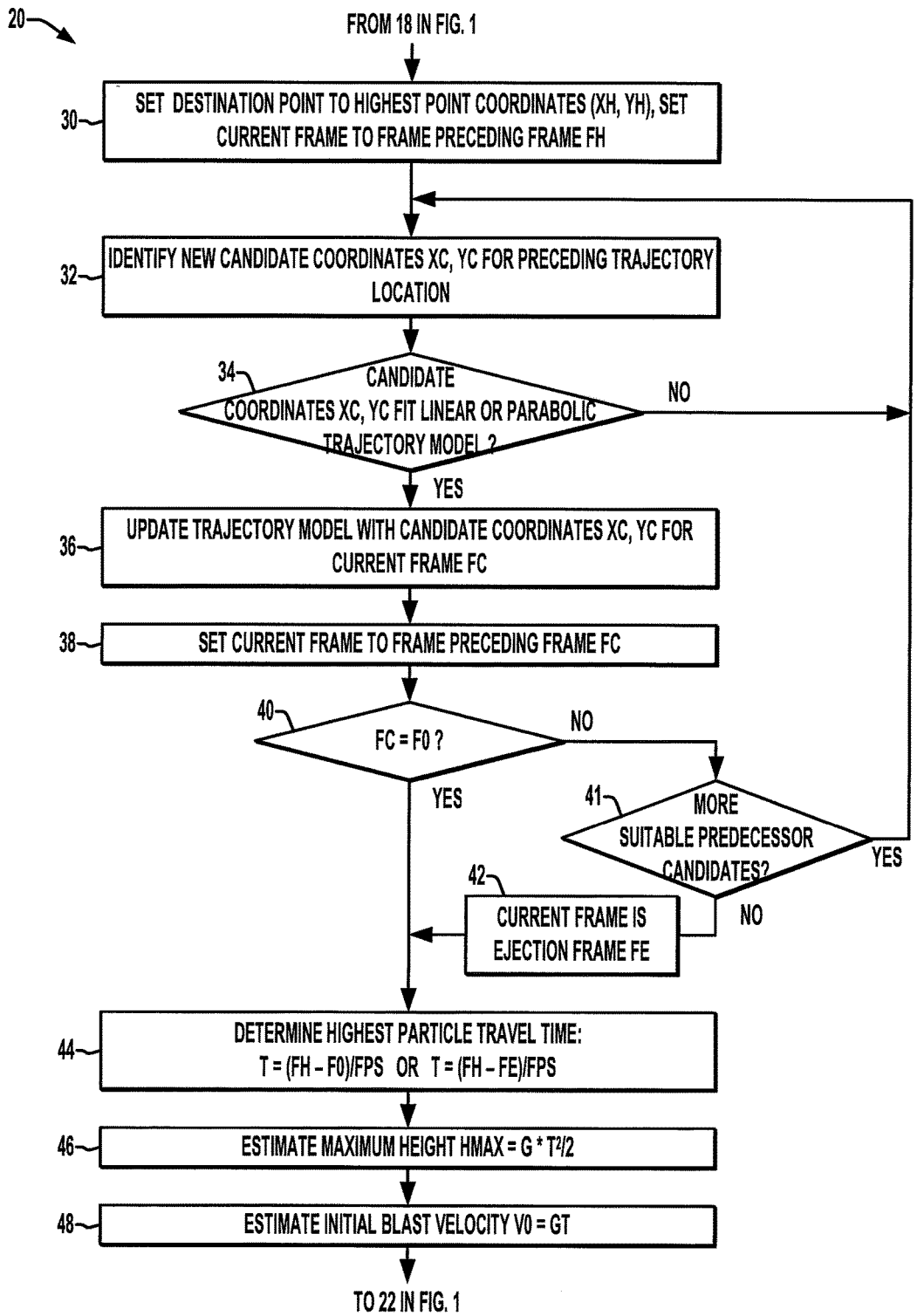
FIG. 2 is a flow diagram illustrating further details of the blast expansion trajectory estimation in the method of FIG. 1.
Figure 3:
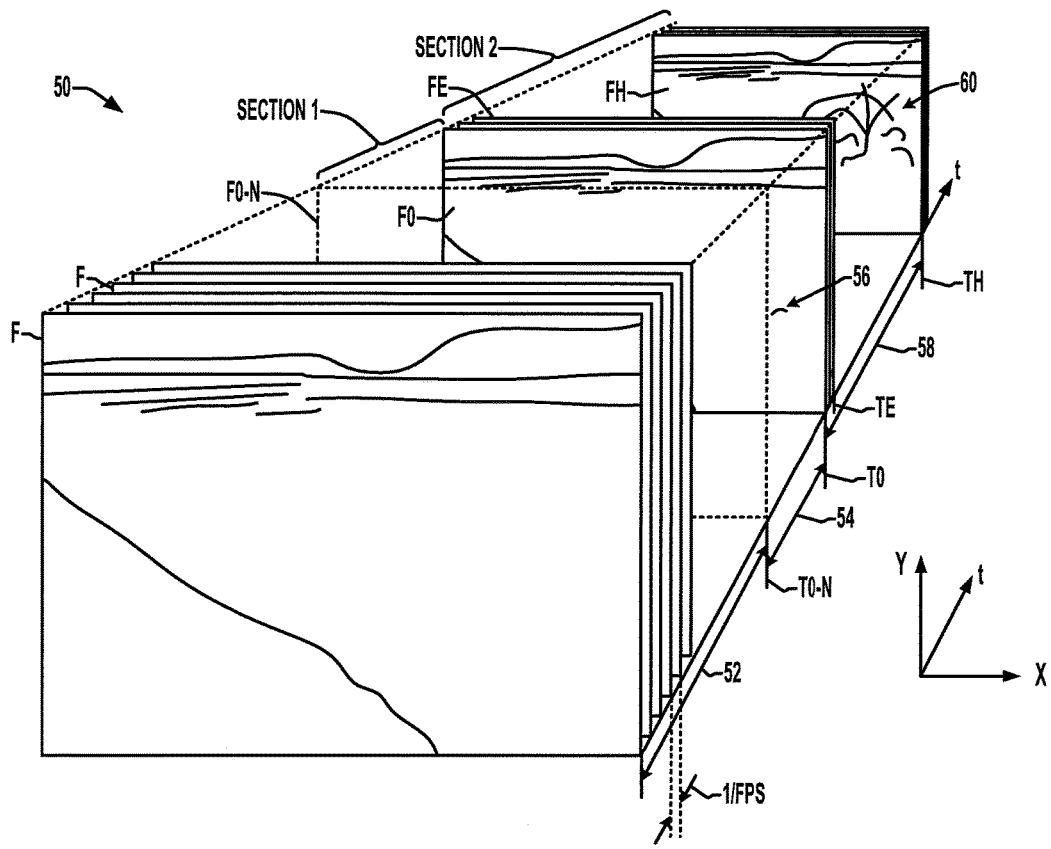
FIG. 3 is a perspective view illustrating blasting video data frames.

Referring initially to FIGS. 1-3, FIGS. 1 and 2 illustrate a blasting video analysis method or process 2 which can be implemented in any suitable processor-based computer system, and FIG. 3 illustrates video data 50 including a plurality of video frames F sequentially obtained at a frame rate in frames per second (FPS). While the method 2 is illustrated and described in the form of a series of acts or events, the various methods of the present disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, processor-executed firmware, FPGAs, logic circuitry, etc. or combinations thereof, in order to provide the blasting video analysis functionality described herein, although the present disclosure is not limited to the specifically illustrated or described applications and systems.

In certain implementations, a blasting video analysis application is executed in a server or other processor-based system which may also (but need not) provide access to, or display of, further blasting data associated with a blasting operation. The blasting video data, moreover, can be obtained by any suitable steps, wherein the blasting video analysis may be performed as part of a system for collecting and processing blast video data to automatically determine quality and other metrics associated with blasting services and equipment. As part of the actual blasting operation, one or more video cameras are set up, for example, at a secure position to capture a blast area of interest, which may employ any suitable mounting structures and apparatus such as a standard consumer tripod to ensure unattended operation during blasting. In operation, the recording equipment is typically started several seconds or more prior to initiation of an actual blasting operation to obtain recorded video frames sufficient for blast analysis background learning as described further herein, and also to allow an operator to exit the blast site prior to blasting initiation. After blasting, blast data entry processing may include collecting blast data which includes blast video data downloaded from the camera.

As seen in FIG. 3, the illustrated video data 50 includes frames F comprising pixel data organized in rows along a horizontal or "X" axis and columns organized along a vertical or "Y" axis, with different frames F for each corresponding sample time along a temporal "t" axis with adjacent frames being separated in time by an amount 1/FPS. In the illustrated example, a blast origination is automatically identified in frame F0 at time T0, and frame FH at time TH includes the highest elevation reach by a highest particle in the video blast sequence.

At 4 in FIG. 1, the video data may optionally be truncated, for example, manually or through execution on a processor of a video truncation module. In one possible example, a blast operator may mark and cut an initial part of the recorded video data with a predefined maximum duration providing sufficient number of frames for analysis, and thus makes the video file a reasonable size for future transfer and storage. In another possible implementation, the original blast video data file is provided to a local blast database (e.g., at a blast site), with the optional truncation at 4 being done to reduce the file size in the database. As seen in FIG. 3, in one example, the truncation removes a first set of frames 52 preceding the blast origination at T0, retaining an integer number N frames F0-N through F0-1 in a first section of video data 54 "SECTION 1" from T0-N through T0-1, with the remaining frames in a second section 58 "SECTION 2" including frame F0 through the final frame of the original data, where the automatic blasting video analysis operates to identify the first occurrence of blast-related image features 56 in the blast origination frame F0 at T0. Moreover, the BVA processing embodiments are further able to automatically identify an ejection point in the blast sequence at time TE corresponding to the frame FE where the highest particle PH is originally ejected, which may occur at the blast origination at T0 or at a later time TE. In the original frame data 50 as shown in FIG. 3, moreover, both foreground and background pixels are included, wherein the highest point frame FH in FIG. 3 shows blast-related foreground images 60 as well as background images associated with the blast site.

The blast video and other blast data is optionally buffered at 6 in FIG. 1, and may be provided to the local database, and/or can be replicated from the local database to a corporate blast consolidated database which buffers the video frames and stores all collected blast data, allowing a user to analyze and obtain data by querying a customer name, blaster name, location, date range, etc. In one possible implementation, moreover, a blast video analysis (BVA) Web server may be provided, which hosts a BVA application and provides new unprocessed blast videos to the blast video analysis application and stores the results of analysis. The BVA Web server, moreover, may provide web user interface features to retrieve original and processed blast videos along with system recommendations regarding blast review initiation. The Web server may additionally provide detailed blast information including without limitation date and time, face height, number of holes and rose, burden and spacing, explosive weight, etc., for example, in response to a search or query by a user. Moreover, the web interface may allow a user to replay entire original blast videos, or portions thereof, and may allow the user to access associated blast data via a user interface providing graphical and numeric information. In the illustrated embodiment, the frames 50 of the truncated color video sequence are buffered so that the BVA module can access any frame for processing in any order.

Figure 4:
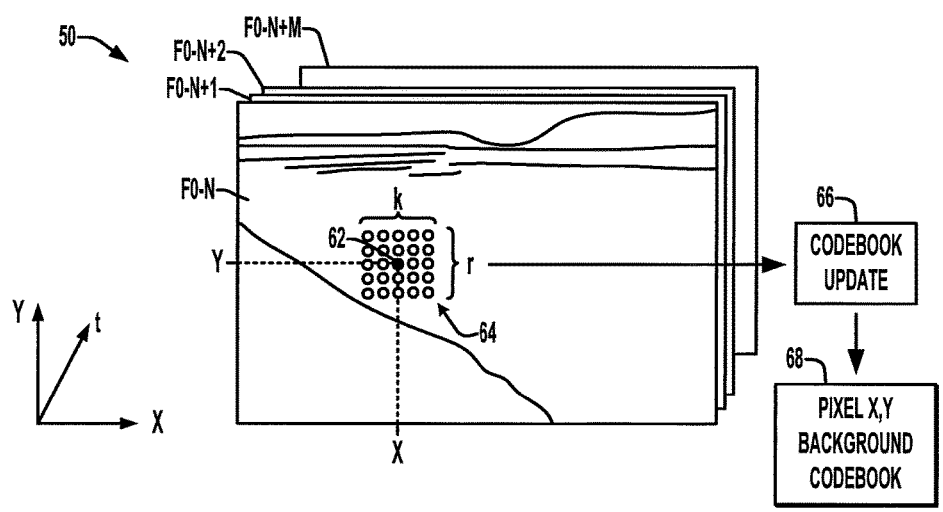
FIG. 4 is a perspective view illustrating background analysis of a portion of the blasting video data frames of Fixed. 3.

Referring also to FIG. 4, the blast video analysis processing begins at 8 in FIG. 1, with background modeling at 10 including simulated camera vibration. The processing at 10 in certain embodiments provides vibration-adjusted background segmentation without requiring foam rubber mats under the tripod to reduce camera vibration. Although many image stabilization techniques have been developed to compensate shaking of hand-held consumer video cameras, such compensation is usually sufficient only for producing visually stable records in typical video capture scenarios. However, strong chaotic vibration caused by blasts when cameras are set up on tripods can only partially be reduced by stabilizers in consumer video cameras. The present disclosure presents a novel approach in which a background modeling process at 10 simulates vibration before the blast begins using frames from the first section 54 in FIG. 3 to set a background model in consideration of vibration affects. In this manner, the subsequent blast analysis is tolerant to camera vibration. Therefore, although strong vibration caused by blasts cannot be totally suppressed by consumer cameras with image stabilization, the background learning of the presently disclosed embodiments can be advantageously employed to eliminate the negative effect of residual vibration on the automatic blast analysis. In this manner, the blasting video analysis as value to blasting video obtained using low-cost cameras and other situations in which mechanical vibration dampening is not available or is insufficient to prevent actual vibration effects in the actual video data 50.

FIG. 4 illustrates several example frames in the first section 54 of the video data 50 including an integer number "M" frames F0-N+1 through F0-N+M, where the background modeling at 10 in FIG. 1 uses at least some of the frames from the first section 54 to create a model of the background to differentiate it from the foreground objects such as blasts. One suitable background modeling employs a codebook method derived from the codebook techniques of G Bradski, A. Kaehler, Learning OpenCV, O'Relly, 2008, pp. 278-285, incorporated herein by reference. The technique of Bradski creates a background model for each pixel with coordinates (x,y) separately using temporal statistics collected during a number of consecutive frames using pixels from consecutive frames at the same coordinates to form a codebook. Thus, the codebook generated during the background learning stage for each pixel contains all possible values which reflect temporal fluctuation of this pixel due to noise, repeated movement of grass, trees, etc. for a stationary camera.

Besides temporal fluctuation due to the reasons described above, each pixel can be affected by spatial fluctuation due to camera vibration. Camera vibration during the blast may create chaotic movement of video frame data along X and Y coordinates in such a way that instead of the original value of the pixel with coordinates (x,y) it may capture a value of any neighboring pixel within a window k*r around it. This spatial fluctuation caused by the blast needs to be modeled during the background learning stage and be combined with the temporal fluctuation modeling for each pixel.

In the background processing at 10 of FIG. 1, a Background Modeling module implemented in the server uses some of the frames from the first section 54 to create a model of the background on which the blast will take place creating a foreground object, and further provides a vibration simulation step as part of codebook formation. In this regard, the background modeling with simulated camera vibration at 10 simulates vibration through processing of several additional neighboring pixels around each pixel within the same frame to add vibration simulation into the process of the codebook formation during all or some frames F0-N through F0-1 of the first section 54 of video data 50. The vibration in one embodiment is simulated at 10 by using several additional neighboring pixels 64 around each pixel 62 (FIG. 4) with coordinates (x,y) within each frame to update a codebook 68 for the pixel 62, and the same process is employed for each pixel on each frame in all or a set of the first section 54 of background frames. In the illustrated example, the procedure Codebook Update 66 is called sequentially k*r times for each pixel (x,y) within each frame, where the actual number k*r of additional or neighboring pixels 64 around the given pixel 62 (x,y) depends on the amplitude of the simulated vibration to be accommodated. For example, The higher values for k and r can be used for accommodating stronger vibration, and vice versa, where the amount of vibration sensitivity can be adjusted. In a typical situation, the amplitude of the simulated vibration should ideally be no less than the expected amplitude of the real vibration caused by blasts in consideration of one or more factors, including without limitation the use of any optional camera mount dampening apparatus, distance from camera location to blast site, the amount of explosive charge used in a given blasting operation, etc. Calling the Codebook Update procedure 66 and passing the central pixel 62 updates the codebook to model the temporal fluctuation of the background pixel value. However, calling the Codebook Update procedure 66 for all other neighboring pixel 64 updates the codebook for the same pixel 62 to model its spatial fluctuation due to camera vibration. As a result, the background codebook 68 describes a background model that reflects both temporal and spatial fluctuations. For pixels around the video frame edges, only available pixels that do not fall outside the frame can be used for vibration simulation.

Figure 19:
FIG. 19 illustrates an example blast video in a blast video sequence.
Figure 20:
FIG. 20 illustrates an example foreground binary frame corresponding to the first blast video frame in FIG. 19.

Continuing in FIG. 2, with the background of a given blast scene modeled at 10, including any employed vibration modeling, the process 2 continues at 12 with segmentation of the image and generation of binary masks. Image segmentation in one embodiment involves generation of a sequence of binary frames from the original video frames (both SECTION 1 and SECTION 2) using background differencing, for example as described in G Bradski, A. Kaehler, Learning OpenCV, O'Relly, 2008, pp. 285-287, incorporated herein by reference. The foreground in binary frames in one example is marked in black, while the background is marked in white, and the binary frames are further processed using conventional morphological filters to suppress segmentation errors and noise. FIGS. 19 and 20 illustrate an example of the foreground and background segmentation with respect to an original frame 110 shown in FIG. 19, and a corresponding binary frame 120 in FIG. 20 shows foreground data in white (e.g., related to a blasting event), with the background data (e.g., associated with stationary scenery) shown in black. In this regard, FIGS. 7, 9, 11, 13-15 and 18 illustrate various concepts of the present disclosure in which foreground image data is represented as black with removed background image information shown in white for ease of illustration, whereas FIGS. 20-29 provide illustrations obtain from actual blast video image data with foreground pixel shown in white and background pixel shown in black.

Figure 5:
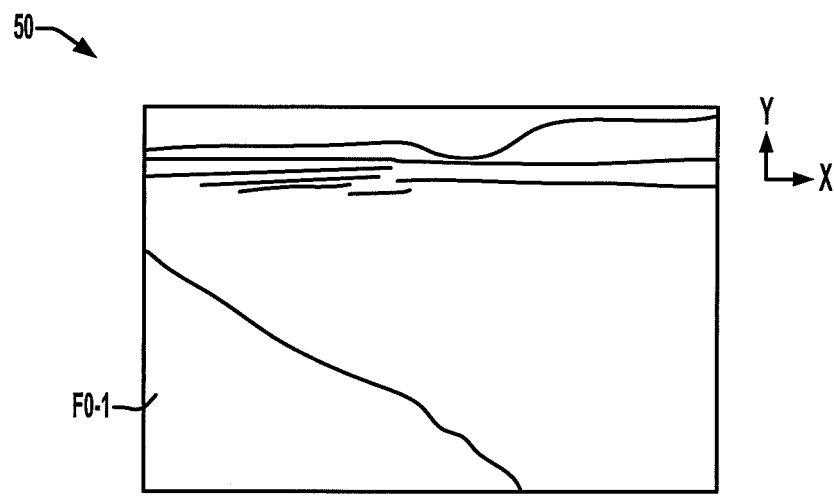
FIG. 5 is a front elevation view illustrating a frame immediately preceding blast origination.
Figure 6:
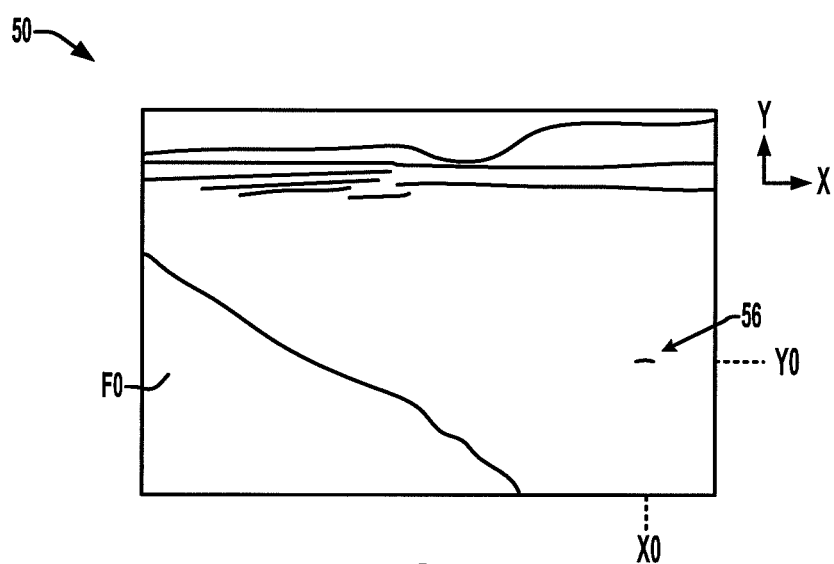
FIG. 6 is a front elevation view illustrating a frame showing blast origination.

Continuing at 14 in FIG. 1, the system automatically detects or identifies a blast origin or blast origination by searching for foreground objects in the sequence of binary images. In one embodiment, this includes identifying a frame (e.g., frame F0 in FIG. 3) and a corresponding time (T0), and may also include determining blast origin coordinates X0,Y0 corresponding to the location of the first appearance of foreground data. As seen in FIGS. 5 and 6, the first frame F0 where a foreground object 56 is detected is marked as the frame with the blast start, wherein the immediately preceding frame F0-1 includes only background image data, whereas the blast origin frame F0 (FIG. 6) includes one or more pixels of foreground data 56, which are distinct from the background imagery including any modeled vibration effects considered as background data. In one possible implementation, the blast origin (X0,Y0) is determined as the central area of the foreground object 56 in the 2D image coordinate space (x,y). It is noted that since all frames prior to frame F0 include only background image data, and therefore do not need to be evaluated during subsequent blasting analysis.

Figure 21:
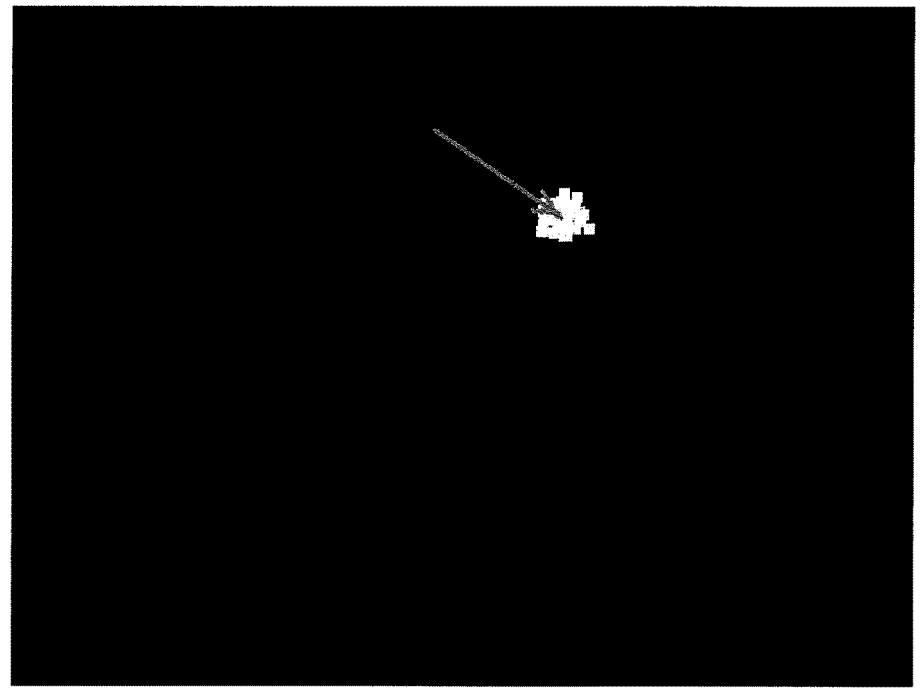
FIG. 21 illustrates an example frame showing an identified blast origination in the video sequence of FIG. 19.

FIG. 21 illustrates another example of an initial blast origin identification using the BVA analysis process 2 with respect to the blasting data of FIG. 19, including a superimposed arrow showing the central point of a group of white foreground pixels in the initial frame F0.

Figure 22:
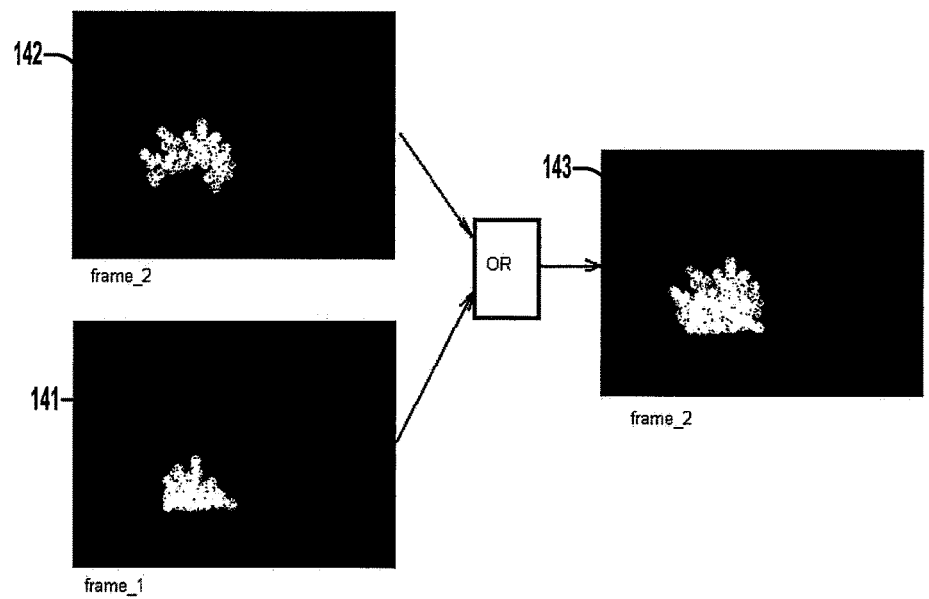
FIG. 22 illustrates an example recalculation of binary foreground frames using a bit-wise OR operation in the video sequence of FIG. 19.

Referring also to FIG. 22, frames following F0 will also generally include foreground pixels identifying blasted materials (e.g., rocks, dirt, particles, clouds, gases, etc.), with these objects and corresponding pixels growing from frame to frame reflecting the blast cloud expansion. In this regard, the blast cloud generally changes its shape substantially from frame to frame. In certain embodiments, in order to simplify the blast cloud expansion analysis, all binary frames starting from the origin frame F0 can be recalculated using the bit-wise OR operation between a current frame and the previous one to store the history of the blast cloud expansion. For example, frame_2=frame_2 OR frame_1 on a pixel location by pixel location basis.

Figures 7, 8:
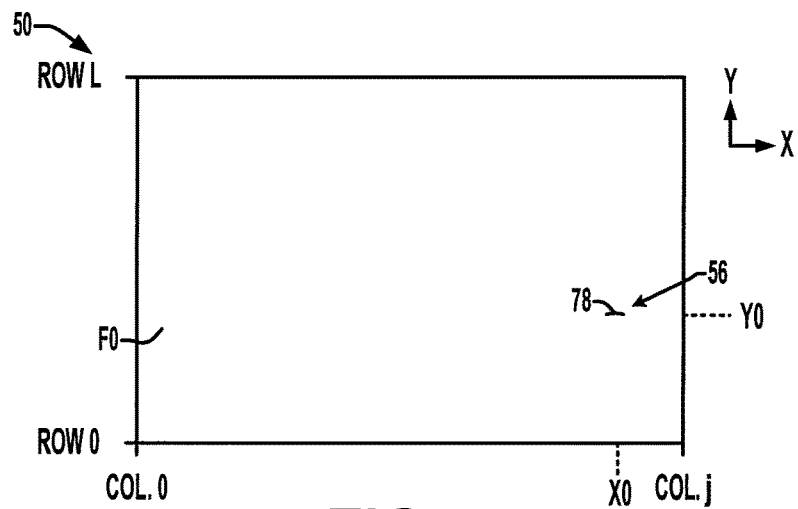
FIG. 7 is a front elevation view illustrating blast outline foreground data for the frame showing blast origination.
FIG. 8 is a schematic diagram illustrating blast outline coordinate data including a highest row number with a foreground pixel for each x-axis pixel column in the frame of FIG. 7.

Referring also to FIGS. 7 and 8, blast outline coordinates (Xc, Yc) of the blast cloud outlines are computed at 16 in FIG. 2 for some or all post-origin frames of the second set 58 (SECTION 2) and are stored. For frame F0 shown in FIG. 7, for instance, the initial occurrence of foreground data 56 is illustrated including an outline 78 representing the highest "Y" axis transition of any foreground pixels for each "X" axis column location. FIG. 8 illustrates corresponding outline coordinate data 70 corresponding to the frame F0 of FIG. 7, including in memory showing the corresponding frame ID (F0 in FIG. 8), a column 74 with entries showing the corresponding X axis pixel column number from capital X=0 through capital X=j, and a column 76 with entries showing an integer value for the highest row number with a foreground pixel for the corresponding X axis pixel column number, where the frame data in this example includes rows 0 through "L" along the "Y" direction. In this example, moreover, the $i^{th}$ entry for X axis pixel column number "i" includes a value (e.g., 87) corresponding to the chosen identified blast origin location X0,Y0.

Figures 9, 10:
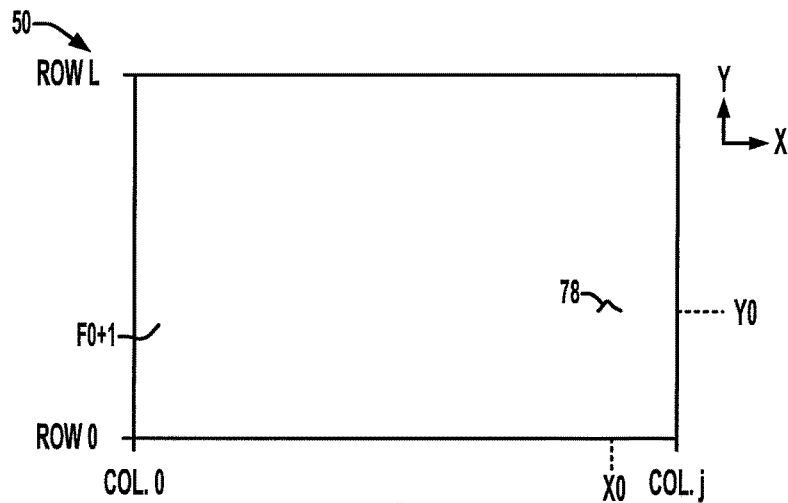
FIG. 9 is a front elevation view illustrating blast outline foreground data for a succeeding frame following blast origination.
FIG. 10 is a schematic diagram illustrating blast outline coordinate data in the frame of FIG. 9.
Figures 11, 12:
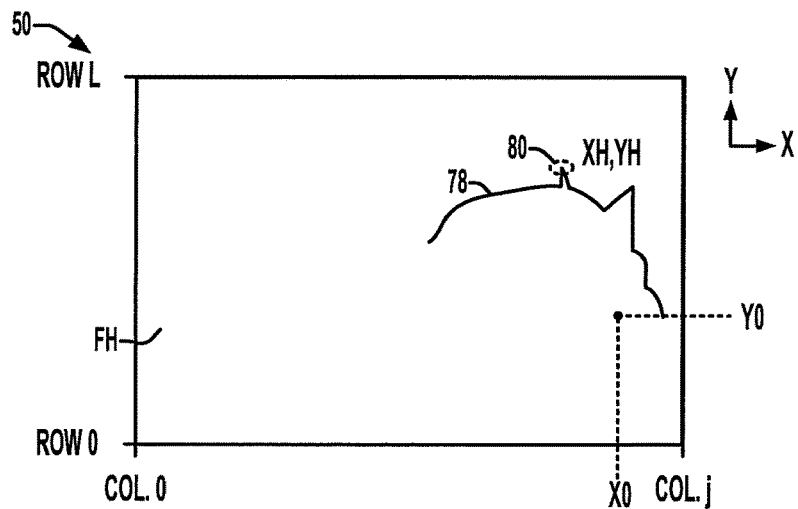
FIG. 11 is a front elevation view illustrating blast outline foreground data for a blast highest point frame.
FIG. 12 is a schematic diagram illustrating blast outline coordinate data in the frame of FIG. 11.

Referring also to FIGS. 9-12, FIG. 9 illustrates the next post-origin frame F0+1 and the corresponding outline 78 which has moved up slightly and expanded laterally by a small amount relative to that shown in FIG. 7. In addition, the corresponding outline coordinate data 70 is shown in FIG. 10, including somewhat higher values in column 76. FIGS. 11 and 12 illustrate a further example at a subsequent frame FH at which the pixel at X axis location i-5 reaches a maximum value of 147 (column 76 in FIG. 12), at a location 80 in FIG. 11.

Figure 23:
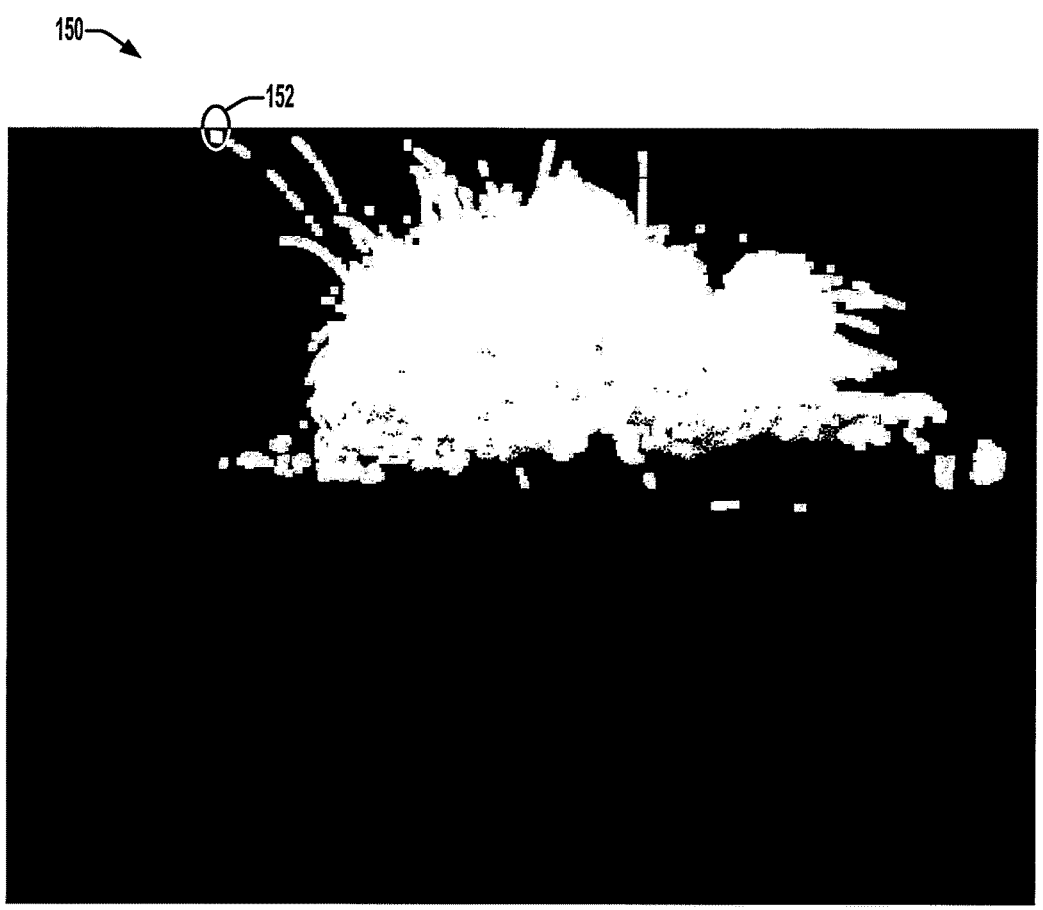
FIG. 23 illustrates identification of a blast highest point frame in the video sequence of FIG. 19.
Figure 24:
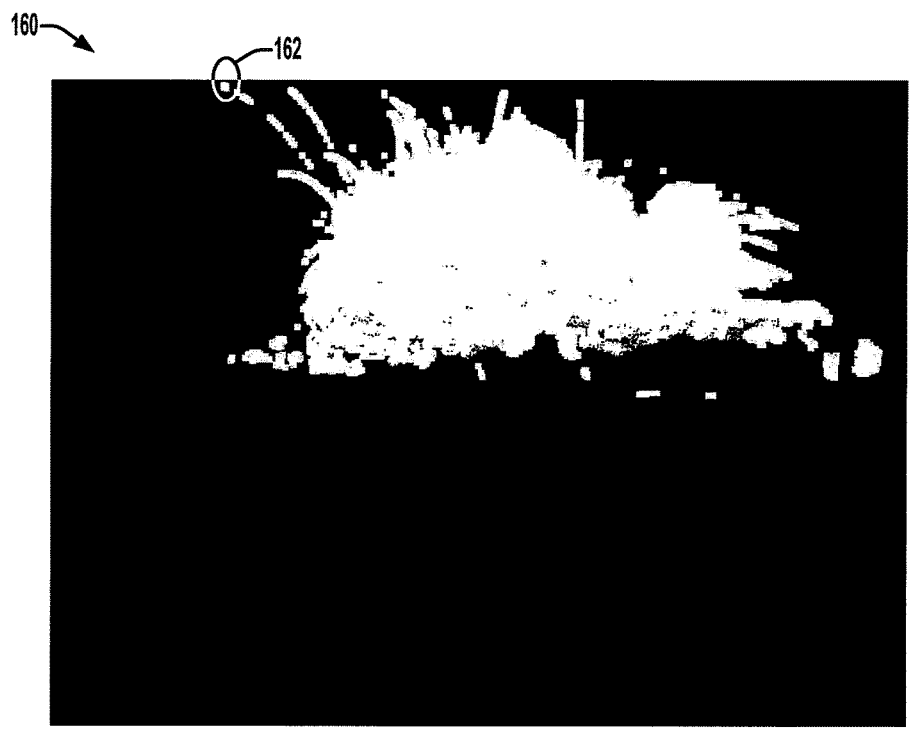
FIGS. 24-29 illustrate backward blast expansion trajectory estimation tracing back to an ejection point or location according to a parabolic trajectory model in the video sequence of FIG. 19.
Figure 25:
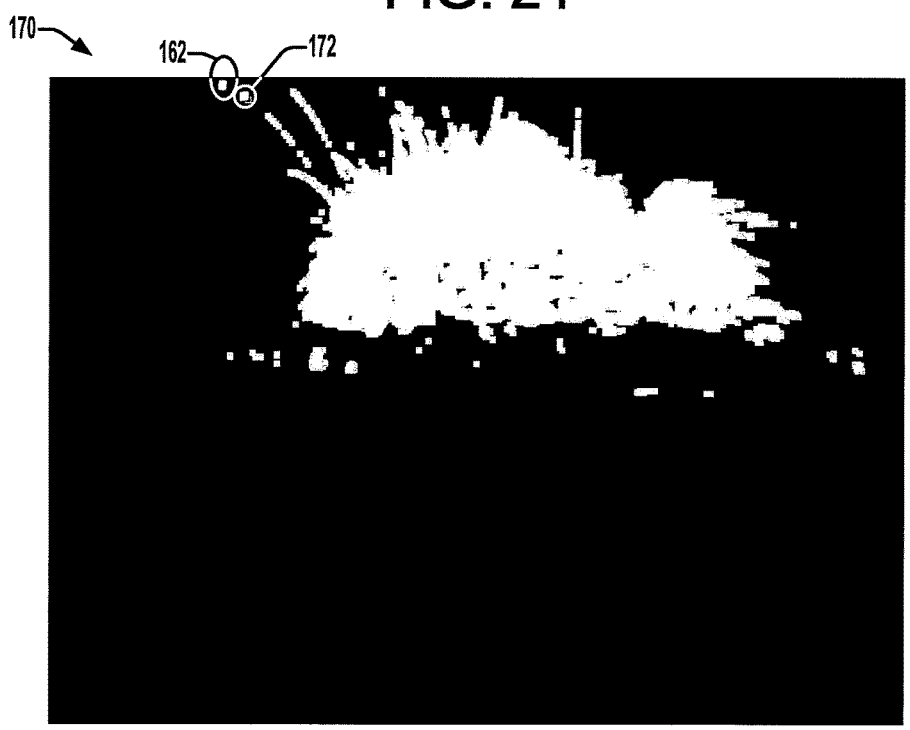

Referring also to FIGS. 11, 12 and 23, the BVA system determines this highest point XH,YH at 18 in the process 2 of FIG. 1 as identifying the highest point coordinates reach by blast particles using the outline coordinate data 70 of the frames in the second section 58. In addition, the process 2 identifies the corresponding frame FH as the "blast highest point frame", and identifies the corresponding particle as the highest particle PH at 18 in FIG. 1. In the illustrated example, for instance, the highest particle PH at location 80 in FIG. 11 is identified by the BVA application initially computing all the outline coordinate data 70 for all the frames in the second section 58, and searching column 76 to find the highest value, identified as YH in FIG. 12. FIG. 23 illustrates an example of the identified highest point particle 152 identified in frame FH for the blast video sequence of FIG. 19.

The process 2 of FIG. 1 also includes blast expansion trajectory estimation at 20 in FIG. 1, further details of which are shown in FIG. 2. In general, the processing 20 includes backwards analysis from the highest point frame FH with respect to the highest particle PH to identify predecessor particle candidates in preceding frames along an assumed straight (linear) or parabolic trajectory model. This process leads to an origin location for the highest particle PH at either the identified/selected blast origin point X0,Y0 or a different ejection point XE, YE for the highest particle PH. In addition to estimating the blast expansion trajectory of the highest particle PH in frames preceding the frame FH, the processing at 20 automatically provides estimation of one or more blast parameters, such as maximum height HMAX, initial blast velocity V0, etc. It is noted that this processing and estimation is done independent of any other blast data, whereby the blasting video analysis aspects of the present disclosure provides significant utility for blasting results analysis independent of camera location, and without the need for visible scales in the image data or any other measurement information. Consequently, the BVA systems and techniques of the present disclosure advantageously provide estimates of important blast information including the maximum height of blast particles and initial blast velocity which would otherwise be difficult or impossible to obtain. In practice, this information can be further analyzed by personnel by querying the BVA system and related blast data, such as the amount and timing of exploded charges, etc., in order to refine blasting set up practices with respect to safety concerns, desired blasting effects, etc.

The process 2 continues in FIG. 1 at 22 with the system of categorizing correctness of the measurements, for example, to indicate relative confidence based on various analyses during blast trajectory estimation. For example, the processing at 20 uses linear and/or parabolic modeling of the movement of the highest particle PH, where the identification of preceding particle locations may closely fit the trajectory model to yield a high confidence in the resulting estimated blast parameters. Conversely, if the processing results in only loose fitting with respect to the linear and/or parabolic modeling (or the processing is unable to trace the highest particle back to an origin), the system may categorize the resulting estimated values as being of low confidence or low correctness. In this manner, blast safety can be graded through comparison of the measured blast parameters against the planned parameters estimated at the blast design stage. Correctness of the measurements can be estimated through comparison of the measured blast expansion against a theoretical model (e.g., straight or parabolic) that describes motion of blast particles. Correctness can be expressed as several categories, for example, reliable (good match), questionable (some inconsistency), incorrect (substantial mismatch), etc.

At 24 and FIG. 1, the system may optionally analyze color information of the original blast video frames (e.g., the frames 58 in FIG. 3) to detect the presence or absence of toxic smoke, and the system displays the estimated parameters (e.g., maximum height, highest particle travel time, initial blast velocity, etc.) to the user, such as via a user interface with numeric indications of these estimated parameters as well as access to other blasting data and the blasting video itself. In addition, certain embodiments of the system also generate overlay indicia at 28 in FIG. 1 (e.g., as further shown in FIG. 16 below) for replay of the blasting video. Detection of toxic smoke that may be produced during the blast is carried out independently from the blast parameter estimation through analysis of color video sequences (after the blast start) in certain embodiments, for example by modifying techniques described in J. Gubbi, et al., Smoke detection in video using wavelets and support vector machines, Fire Safety Journal, 2009 and/or R. J. Ferrari, H. Zhang, C. R. Kube, Real-time detection of steam in video images, Pattern Recognition 40 (3) (2007) pp. 1148-1159, and/or Khan, S.; Shah, M. Object based segmentation of video using color, motion and spatial information, Proceedings of the 2001 IEEE Computer Society Conference on Computer Vision and Pattern Recognition, 2001. CVPR 2001. Volume: 2, pp. 746-751. and/or Bohush, R.; Brouka, N. Smoke and flame detection in video sequences based on static and dynamic features, Signal Processing: Algorithms, Architectures, Arrangements, and Applications (SPA), 2013. pp. 20-25, all of which are incorporated by reference.

Figure 30:
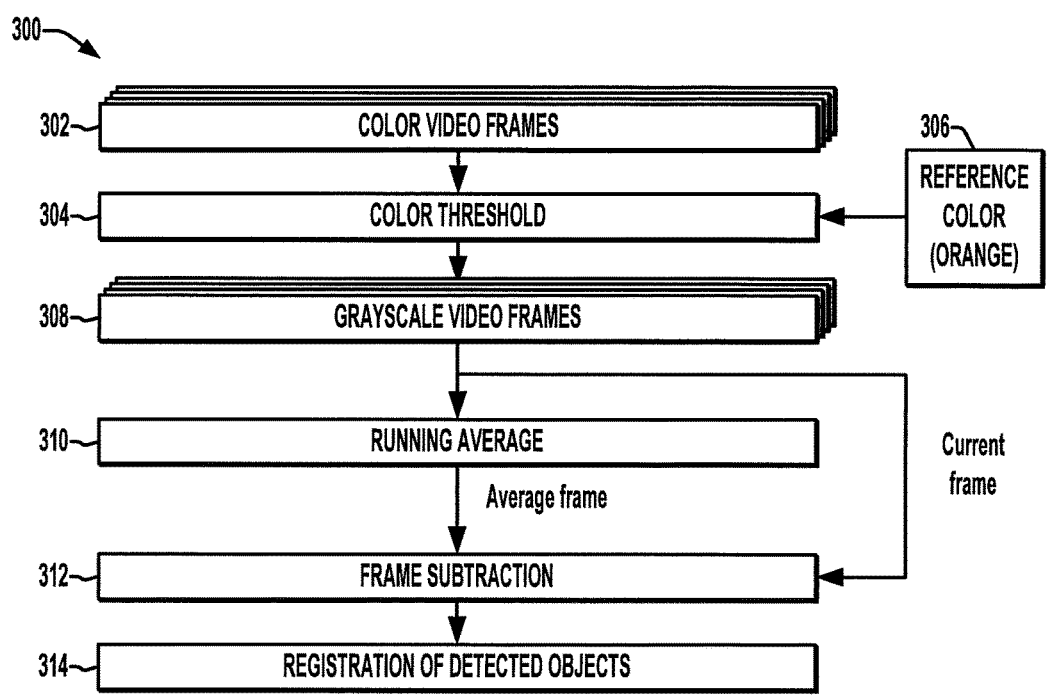
FIG. 30 is a flow diagram illustrating further details of an example toxic smoke detection feature of the blasting video analysis system.

FIG. 30 illustrates an example process 300 showing further details of toxic smoke detection functionality in certain embodiments of the blasting video analysis system. The toxic smoke detection function operates to detect orange colored clouds (of toxic gas) that may appear on videos in front of dust/steam clouds of blasts, the remainder of which usually are not orange. The algorithm detects new moving objects on a background that is moving itself, and compares the color of moving objects against a pre-defined color of toxic gasses (a reference color such as orange 306 in FIG. 30). The illustrated smoke detection algorithm operates on the color video frames 302 as shown in FIG. 30, and compares them with a color threshold 304 set by the reference color 306 to produce grayscale video frames 308. In practice, the color threshold operation at 304 eliminates irrelevant video data by removing pixels with colors beyond a specified range. It sets the thresholds to select pixels only with colors within a predefined range from the reference 306 in the RGB color space or other suitable color space (e.g., CMYK, etc.). The range is useful since the actual orange smoke color on captured video may vary due to camera color balancing, or the color of chemical reaction, etc., and pixels with other colors are discarded by the process. The produced grayscale objects at 308 may correspond to various areas with acceptable colors. Some of them may be related to toxic gas clouds, while others to soil of orange color, or other stationary objects. A running average at 310 in FIG. 30 (e.g., G Bradski, A. Kaehler, Learning OpenCV, O'Relly, 2008, p. 276 incorporated by reference above) produces "Average frames" averaged over time in such a way that more recent frames are given more weight that those farther in the past. To detect recently appeared objects in the current frame, the averaged frame is subtracted from the current frame at 312 to separate foreground objects from the stationary background to produce registration of detected objects at 314. In certain embodiments, foreground objects (moving/expanding) are produced by emitted clouds of orange smoke which are typically changing from frame to frame, and such objects need not be subtracted, while all stationary background objects will be subtracted. If foreground objects are detected, the function returns a flag alarming the presence of orange smoke in the processed video. This example is in contrast to prior algorithms which are not designed to detect fast moving smoke of one color on the background of moving clouds of another (sometimes similar) color and cannot be applied directly in blasting video analysis applications, since detection of slowly rising smoke and fire is a different problem. Other non-limiting embodiments may implement a module Separation of Foreground Objects from the Background employing a combination of the running average and the frame subtraction algorithms or adaptive spatiotemporal background modeling and spatiotemporal subtraction algorithms. A module Color analysis module may be employed, which may be implemented in certain embodiments as the color threshold 304 in RGB color space, or other published methods developed for color matching in other color spaces may be employed, including without limitation HIS, CIE YUV, or CIE LUV. In other embodiments, different algorithms can be used, such as algorithms developed for use in smoke/fire detection solutions.

Figure 29:
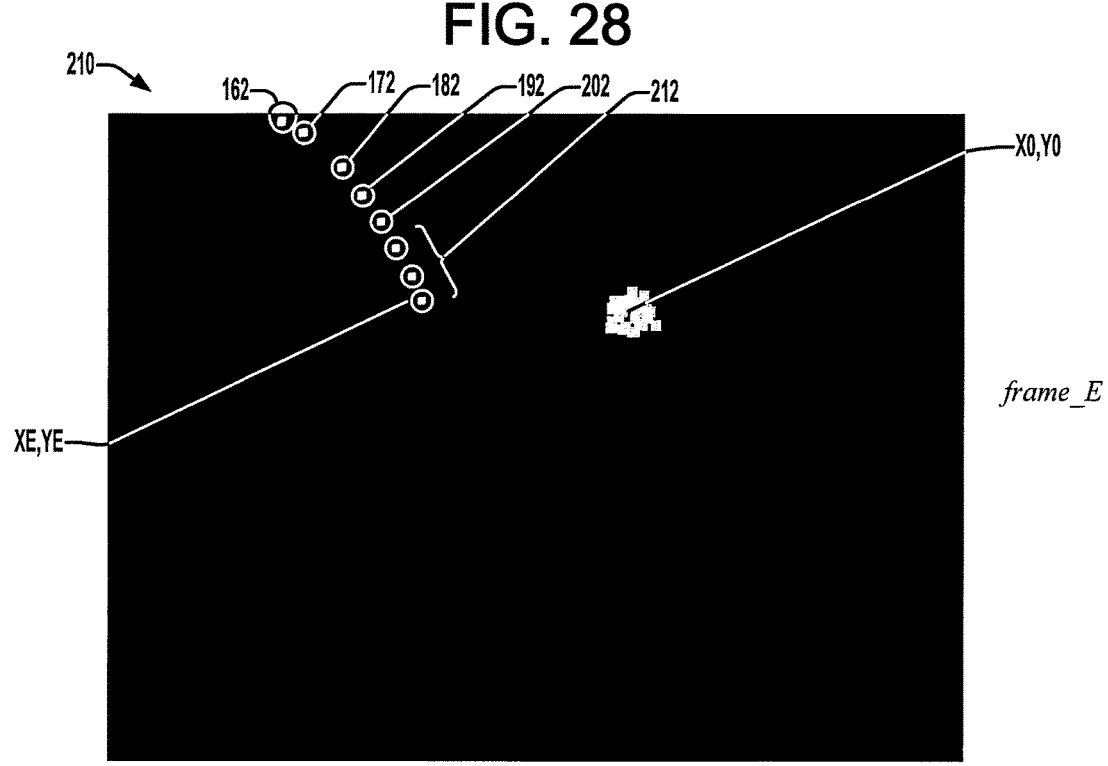

Referring now to FIGS. 2, 13-15 and 24-29, once XH and YH and the origin and highest point frames F0 and FH are known, a trajectory to the highest blast point can be estimated and the relevant blast parameters such as height and initial blast velocity) can be estimated. As previously noted, the origin of the trajectory to (XH,YH) is not necessarily (X0,Y0) and may depend on the borehole pattern geometry and delay timing strategies. In the example trajectory trace estimation of FIGS. 13-16, the highest particle indeed originates at the identified origin point X0,Y0, whereas FIGS. 24-29 illustrative example in which the highest particle PH originates at a different origination point XE,YE (FIG. 29).

Figure 13:
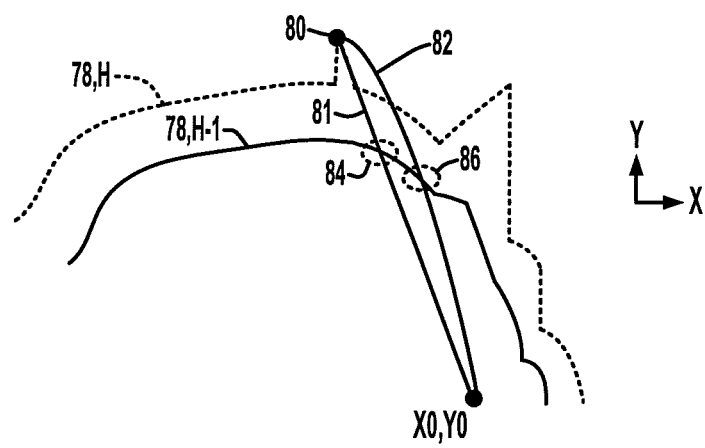
FIG. 13 illustrates backward blast expansion trajectory estimation according to linear and parabolic trajectory models using the blast outline foreground data for the blast highest point frame and a preceding frame.

The blast expansion trajectory estimation processing 20 begins at 30 and FIG. 2 where the destination point is set to the highest point coordinates XH,YH (e.g., point 80 in frame FH of FIG. 13, point 162 in the frame FH 160 of FIG. 24), and the current frame is set to the frame FH-1 preceding the highest point frame FH at 30 and FIG. 2. At 32, the system identifies a new candidate position with coordinates XC,YC for a preceding trajectory location in consideration of a trajectory matching criterion, such as best fit to a trajectory model. In particular, specific embodiments utilize a straight and/or parabolic model, where FIG. 13 illustrates a straight line model 81 from the highest point 80 back to the origin point, as well as a parabolic model 82. In addition, FIG. 13 illustrates the blast cloud outline data 78,H corresponding to the highest point frame FH, and the blast cloud outline data 78,H-1 for the current frame FH-1. As seen in FIG. 13, using the models 81 and 82, there are two locations 84 and 86 which respectively fit the trajectory models 81 and 82, which are identified at 32 in FIG. 2. As further shown in the blast video frame example 170 of FIG. 25, a candidate point or location 172 is identified at 32 in FIG. 2. The processing 20 proceeds at 34 and FIG. 2, where a determination is made as to whether the candidate coordinates fit a linear or parabolic trajectory model. If not (NO at 34), the blast expansion trajectory estimation processing 20 returns to identify one or more new candidate locations at 32. If the candidate coordinates fit the linear or parabolic trajectory model (YES at 34), the trajectory model is updated at 36 with the candidate coordinates for the current frame FC, and the current frame is set to the next preceding frame at 38.

Figure 14:
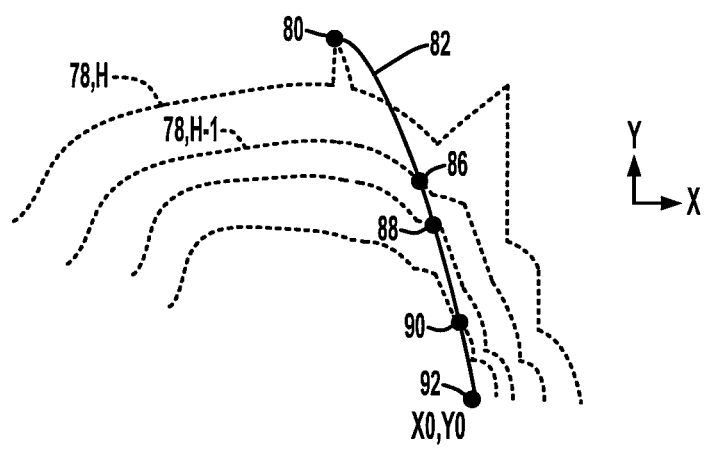
FIG. 14 illustrates further backward blast expansion trajectory estimation to an ejection point according to the parabolic trajectory model using blast outline foreground data from further preceding frames.
Figure 15:
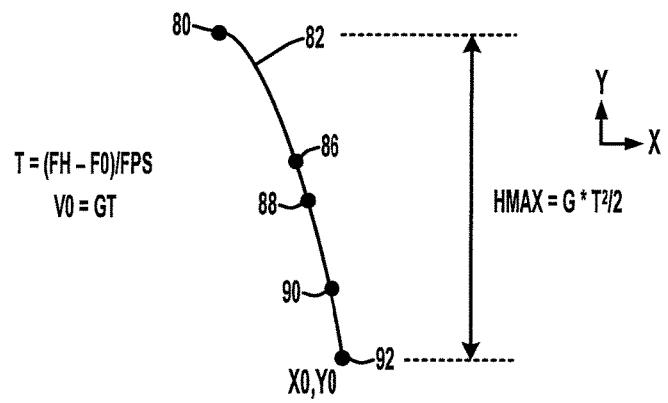
FIG. 15 illustrates computation of the maximum height of the highest blast particle according to the blast expansion trajectory estimation as well as computation of the ejection velocity.
Figure 26:
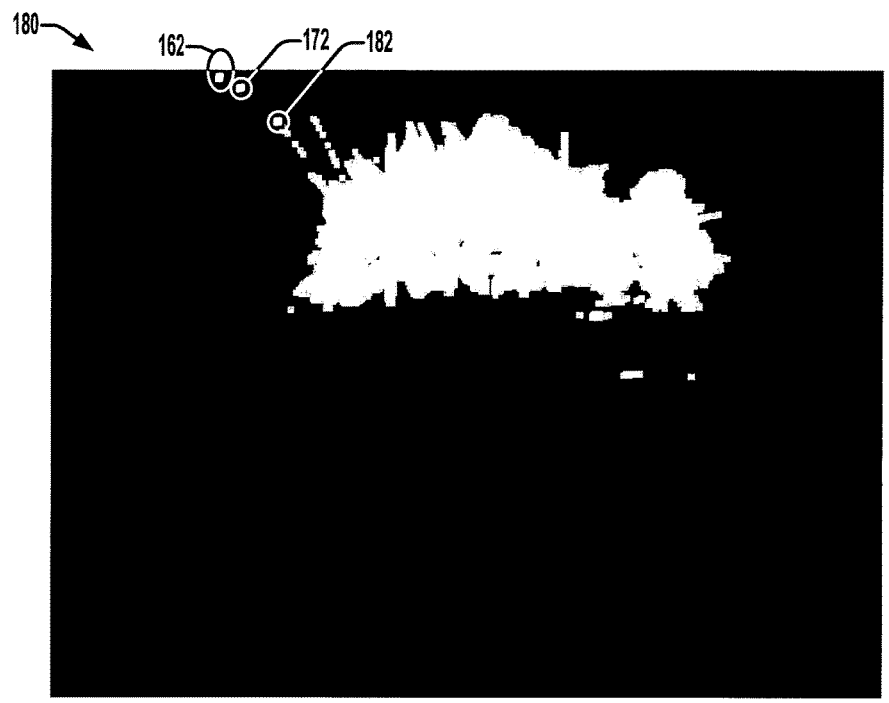
Figure 27:
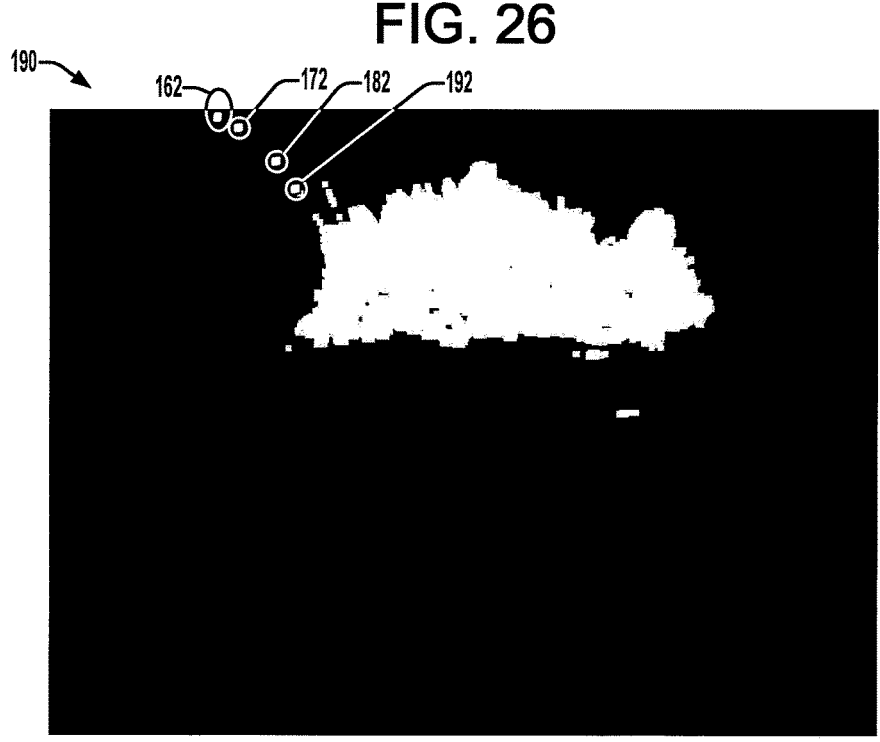
Figure 28:
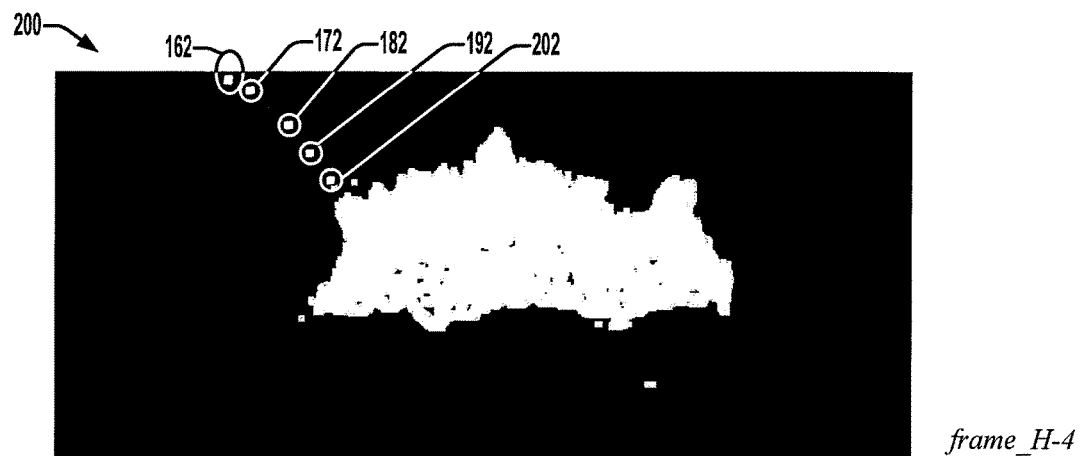

In the example of FIG. 26, the preceding frame FH-2 is next evaluated, in which a further proceeding particle location 182 is identified in the frame 180. As seen in FIG. 2, moreover, a determination is made at 40 as to whether the current frame FC is the origin frame F0. If not (NO at 40), a determination is made at 41 as to whether there are more suitable predecessor candidates. If so (YES at 41), the process returns again to identify a new candidate location for the updated current frame location at 32. Otherwise (NO at 41), the system determines that the current frame is an ejection frame FE at 42. The process 20 iteratively evaluates preceding frames (NO at 40 and YES at 41) to identify acceptable predecessor candidate locations 86, 88, 90 in the frame foreground data at 32-41, as illustrated in FIG. 14. In this example, the parabolic model 82 is substantially fit by the trajectory defined by the initial origin location 92 (X0, Y0) and locations 90, 88, 86 and 80 at the peak of the parabola. In this example, the process 20 of FIG. 2 determines at 40 that the current frame FC is the origin frame F0 (YES at 40), and then proceeds to estimate or determine the highest particle travel time T at 44 according to the formula T=(FH−F0)/FPS, and then determines or estimates the maximum height $HMAX=G*T^2/2$ at 46 (also shown in FIG. 15), wherein G is the acceleration of gravity. In this manner, the BVA system advantageously provides an estimate of the maximum height achieved by the highest particle PH entirely independent of any blasting data or other information apart from the actual frame data 50.

In the illustrated example, moreover, the system estimates or otherwise determines the initial blast velocity V0 at 48, according to the equation V0=GT using the estimated travel time T for the highest particle PH. In this regard, the ejection velocity V0 is estimated as the vertical velocity in view of the match to the parabolic model 82. Other computational techniques can be employed for parabolic trajectories, for example, by computing the initial injection angle and lateral movement of the highest particle PH relative to a vertical (e.g., Y) direction in order to determine an ejection velocity vector having non-zero X and Y components. Moreover, where the determined trajectory is generally a straight line (e.g., according to the straight-line trajectory model 81 in FIG. 13), similar processing can be used to determine a vector for the initial ejection velocity V0.

Figure 16:
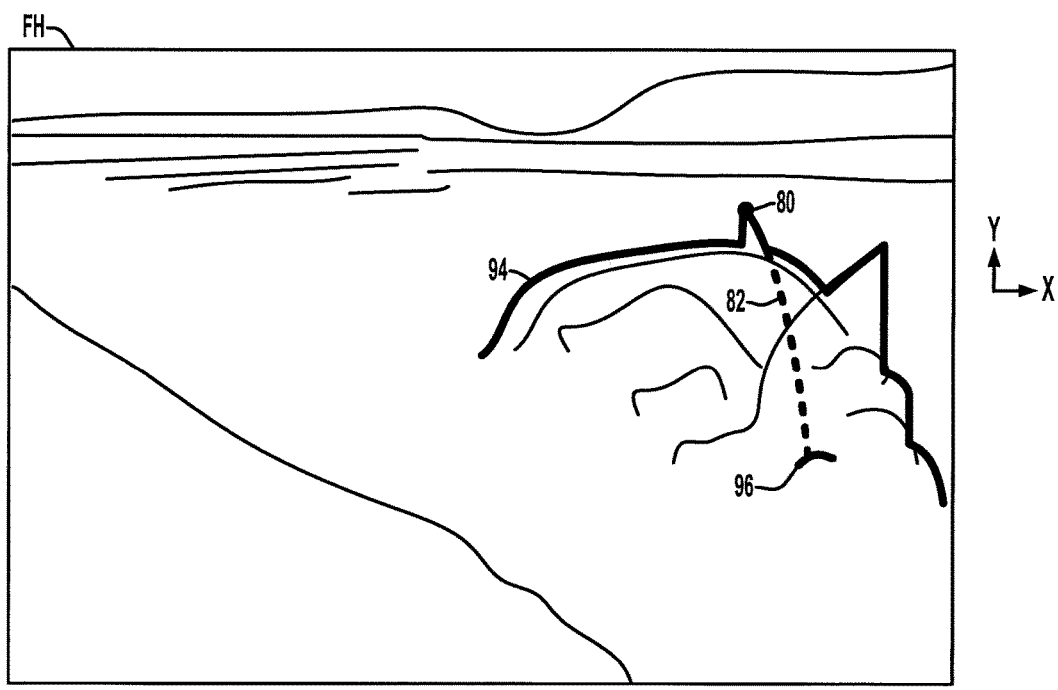
FIG. 16 illustrates overlay indicia superimposed on background and foreground image data in the blast highest point frame based on the estimated blast parameters.

As further shown in FIG. 16, the system can also generate overlay indicia for replay of the blast video data 50, including a blast outline indicia 94, such as a curve corresponding to the highest blast outline data shown in one color overlaid on top of the blasting video, as well as a trajectory curve (e.g., the parabolic trajectory 82 in the above example, shown in dashed line in the figure, which may be displayed in a second color as a solid or dashed line while the blast video is being played, as well as another indicia 96 showing the blast origin.

Referring again to FIGS. 26-29, this example shows a parabolic blast expansion trajectory estimation which does not return to the originally identified blast origin point, but instead returns to a different ejection point XE,YE. Continuing with the identification of the preceding particle location 182 in the frame 180 of FIG. 26, the process continues in reverse order from the destination point 162 in the highest point frame FH towards an unknown ejection point (XE,YE) in an unknown frame FE. In sequential blasting, particles that reach the location 162 (XH,YH) can be ejected from any borehole and therefore (XE,YE) may be different from (X0,Y0) and the frame FE is not necessarily the same as frame F0. The process then proceeds to the next preceding frame 190 shown in FIG. 27, in which the next candidate is identified and found to be sufficiently fitted to the parabolic trajectory model, and from there the process continues to the frame 200 shown in FIG. 28 to identify the next earlier preceding location 202, and further iterations are shown in FIG. 29 at frame 210 to identify the locations 212, including an identified ejection location XE,YE. FIG. 29 further shows that this location XE,YE is different from the identified blast origination location X0,Y0. In this case, the process 20 (FIG. 2) determines at 40 that the current frame 210 is not the origin frame F0 (NO at 40), but then determines at 41 that there are no more suitable predecessor candidates (NO at 41). In this case, the system determines at 42 that the current frame is the ejection frame FE, and proceeds to determine the highest particle travel time at 44 according to the equation T=(FH−FE)/FPS, and computes the maximum height and initial blast velocity parameters at 46 and 48 as previously described. In this regard, a trajectory candidate point is searched in certain embodiments during the identification and 32 and the verification at 34 to provide minimum deviation from the linear model 81 and/or the parabolic model 82, and the point is selected which has minimal deviation from one of the models (the parabolic one in the examples shown) is selected as next trajectory point and then the corresponding model is updated. In certain embodiments, moreover, the system can determine during a given iteration if the candidate point does not fit well into any trajectory model (e.g., the trajectory contradicts with the law of gravity because the point may actually belong to a crossing trajectory of another fly-rock, or a wrong candidate point was selected in the previous iteration due to image segmentation errors), the previous trajectory point is rejected and search for a better candidate in the previous frame is reiterated. Other candidate points are considered apart from the rejected one to make sure all subsequent trajectory points are consistent with linear or parabolic movement. In this regard, any suitable form of iterative searching, including complete evaluation of all possible candidates or select subsets thereof may be employed. In certain embodiments, all subsequent iterations search for candidate points use the current models of the trajectory in such a way that new candidates lead to minimal deviation from the modeled trajectory. In certain implementations, moreover, after a successful candidate is added, the trajectory model is updated to, and frames which introduce inconsistency into the trajectory estimation because acceptable candidates cannot be found, maybe identified as 'inconsistent' and used later for categorization of the blast trajectory correctness. The process 20 is completed in the illustrated embodiments when the trajectory is complete, indicating one of two possible conditions: there are no more acceptable candidate points and therefore, the ejection point (XE,YE) is found (e.g., FIG. 29), or the iteration reached frame F0 and therefore the ejection point (XE,YE) is the same as the blast origin (X0,Y0), for example, as shown in FIG. 14. In one possible implementation, moreover, the categorizing of the correctness of the measurements at 22 in FIG. 1, for example, as reliable, not reliable, most likely wrong, etc., is determined according to the number of 'inconsistent frames counted' in one embodiment. Thus, in cases when automatic blast analysis is hindered by poorly captured video, or excessive vibration, or other factors, the system can indicate that visual analysis by experts may be required.

The blasting video analysis system may operate according to software that processes the captured video sequences executing on a PC platform, a server, a web-based browser application or any other suitable form of implementation, and can also be ported to other computer platforms that have sufficient processing power. The generated reports can be accessed though the Internet, or local networks. As discussed above, moreover, the system in certain embodiments can include a smoke detection module to differentiate clouds of poisonous gasses emitted by explosive materials from clouds of dust and vapor. Color identification can be used, for example to identify particle orange smoke indicative of poor explosion performance resulting from nitrogen oxides and low level detonation, where the system in certain embodiments can abstract potentially confusing background due to orange or red colored dusts, rocks prior to blasting and such colored dusts during blasting.

Figure 17:
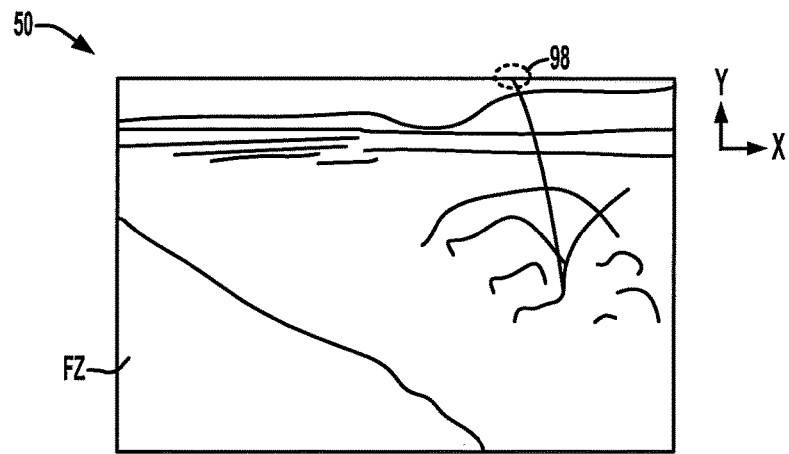
FIG. 17 illustrates a blasting video data frame in which the highest particle goes off-screen.
Figure 18:
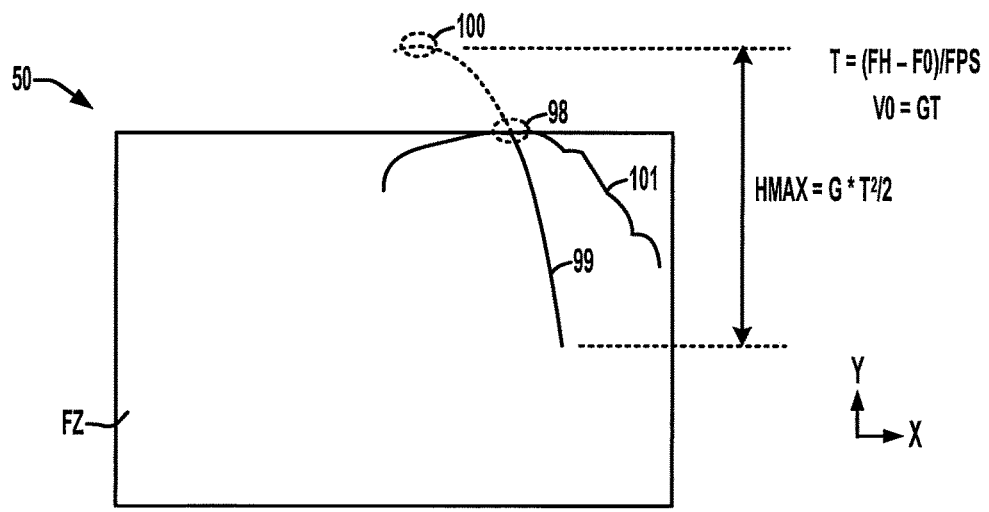
FIG. 18 illustrates estimation of the highest point reach by the highest particle in FIG. 17 along an estimated trajectory for computation of the maximum height and ejection velocity.

Referring also to FIGS. 17 and 18, further aspects of disclosure advantageously facilitate the above processing even where the highest point reach by a particular particle goes off screen (outside the visible area in the video data 50). For example, FIG. 17 illustrates one blast situation in which the highest location 98 reached by a foreground image element is at the maximum "Y" value (the top row of the video data), but the backwards trajectory estimation processing indicates that the shape of the parabolic trajectory that best fits that particular highest particle PH does not indicate that the maximum identified location 98 is indeed the highest elevation reached by that particle PH. In this situation, as shown in FIG. 18, the system advantageously computes a parabolic match to the trajectory 99, which extends upward to a location 100 (beyond the actual video data range), where the highest particle PH is assumed to have stopped rising. The system can thus determine the travel time from the last identified location 98 to the predicted final location 100 based on the previously identified parabolic path 99 back to the ejection point (e.g., using the techniques described above), and determine the number of additional frames (beyond the last frame at which the last outline was obtained in FIG. 18), and therefore compute the travel time T, maximum height and ejection velocity as described above.

The disclosed techniques and systems thus advantageously provide video analysis methods adapted to automatically track a trajectory from a blast origin to the highest point reached by blast particles, and the video sequence processing method 2 can automatically measure or estimate the maximum height reached by the blast particles regardless the video camera position and its zoom settings during recording. Moreover, the system accommodates vibration effects introduced into the video data itself, and advantageously differentiates foreground and background data even in the presence of camera vibration during recording, thereby facilitating the use of low-cost video recording equipment without the expense and unreliability of dampening apparatus at a blast site. Moreover, the blasting video analysis processing techniques and systems can automatically categorize correctness of the measurements and therefore indicate when additional visual inspection may be required to verify the report generated automatically. This may be needed when video recording has not been done properly. The system and method further provide other advantages, including without limitation Blast pattern optimization, Flyrock reduction, Measurement during blast, Rectify subsequent blasts for improved performances, and Manage and mitigate risk. In certain implementations, the blasting video analysis system can include a processor-based system, such as a PC, server, etc. operating according to a C++ function that implements the process of Automatic Analysis of Video Sequences illustrated and described above. Below is an example C++ function that implements the process of Blast Expansion Trajectory Estimation and Measurement of

```cpp
BlastRating entry( char* fileAddr, char* exportPath, char* logFilePathPassed )
{
    BlastRating analysisResult = { 0, 0 };
    string savedExcelFilePath = "C:\\Blastechnology\\savedAnalysis\\";
    // ### logfile creation ### //
    string logFilePath = "C:\\Blastechnology\\Logfiles\\";;
    string logFileName = "logfile.txt";
    string tmpLogFilePath = logFilePath + logFileName;
    char* logFileAddr = (char*)tmpLogFilePath.c_str( );
    if (logFilePathPassed != NULL)
        logFileAddr = logFilePathPassed;
    ofstream logfile;
    logfile.open(logFileAddr, ios::app);
    logfile << "I. " << getTime( ) << " Program initiated with the following settings:\n";
    logfile << "I. " << getTime( ) << " Input: " << fileAddr << "\n";
    logfile << "I. " << getTime( ) << " Output: " << exportPath << "\n";
    logfile.flush( );
    vector<IplImage*> images (MAX_VID_LEN);
    vector<IplImage*> deltaImages (MAX_VID_LEN);
    vector<IplImage*> bwMasks (MAX_VID_LEN);
    vector<IplImage*> relDeltaImages (EST_BLAST_LEN);
    vector<IplImage*> deltaGSImages (MAX_VID_LEN);
    vector<IplImage*> mvX(MAX_VID_LEN);
    vector<IplImage*> mvY(MAX_VID_LEN);
    // saves the video frames into an image vector
    int frame_n;
    float fps;
    int ActualWidth;
    int ActualHeight;
    CvCapture* capture = cvCreateFileCapture(fileAddr);
    if( capture == NULL)
    {
        frame_n = -1;
    }
    else
    {
        ActualWidth = DEFAULT_WIDTH;
        ActualHeight = DEFAULT_HEIGHT;
        fps = (float)cvGetCaptureProperty(capture, CV_CAP_PROP_FPS );
        frame_n = setImageVect( capture, images, ActualWidth, ActualHeight );
    }
    logfile << "I. " << getTime( ) << " - Video consist of " << frame_n << " frames\n";
    if ( frame_n==-1 )
        logfile << "E. " << getTime( ) << " - Video " << fileAddr << " would not load\n";
    else if (frame_n < 120 )
        logfile << "W. " << getTime( ) << " - Video " << fileAddr << " Too few frames have been loaded (less than needed for analysis)\n";
    else if (frame_n == MAX_VID_LEN)
        logfile << "W. " << getTime( ) << " - Video " << fileAddr << " only " << MAX_VID_LEN << " frames have been loaded (the limit)\n";
    else
        logfile << "I. " << getTime( ) << " - Video " << fileAddr << " loaded successfully\n";
    logfile.flush( );
    if( frame_n == -1 || frame_n < 120 )
    {
        logfile.close( );
        analysisResult.heighInFeet = -1;
        analysisResult.roofing = -1;
        analysisResult.correctness = -1;
    analysisResult.captureQuality = -1;
        return analysisResult;
    }
    CvSize imgSz = cvSize(ActualWidth, ActualHeight);
    int startFrame, endFrame, blastLen;
    int blastArea [MAX_VID_LEN];
    CvMat* allHeights = cvCreateMat(EST_BLAST_LEN, ActualWidth, CV_32S);
    CvMat* avgHeights = cvCreateMat(EST_BLAST_LEN, ActualWidth, CV_32S);
    CvMat* initHeights = cvCreateMat(1, ActualWidth, CV_32S);
    CvMat* avgInitHeights = cvCreateMat(1, ActualWidth, CV_32S);
    CvMat* maxHeights = cvCreateMat(1, ActualWidth, CV_32S);
    CvMat* avgMaxHeights = cvCreateMat(1, ActualWidth, CV_32S);
    CvMat* deltaHeights = cvCreateMat(EST_BLAST_LEN, ActualWidth, CV_32S);
    // ############## Video Analysis ################## //
    setDeltaImageVect( images, frame_n, bwMasks, deltaImages );
```

```
        for(int i=0; i<frame_n; i++)
            blastArea[i] = getWhiteCount(deltaImages[i]);
        int frameIndex = getMaxArea(blastArea, 0, frame_n);
    if( blastArea[frameIndex] < 50 )
        {
            logfile << "W. " << getTime( ) << " Blast has not been detected\n";
            logfile.close( );
            analysisResult.heighInFeet = 0;
            analysisResult.correctness = -1;
        analysisResult.captureQuality = 0;
            return analysisResult;
        }
        if( blastArea[frameIndex] < 1000 )
        {
            logfile << "W. " << getTime( ) << " Low contrast or distant blast\n";
            analysisResult.captureQuality = 1;
        }
        else if( blastArea[frameIndex] < 4000 )
            analysisResult.captureQuality = 2;
        else if( blastArea[frameIndex] < 7000 )
            analysisResult.captureQuality = 3;
        else if( blastArea[frameIndex] < 10000 )
            analysisResult.captureQuality = 4;
        else
            analysisResult.captureQuality = 5;
        startFrame = getBlastStartFrame (blastArea, frame_n, frameIndex);
        endFrame = getBlastEndFrame(startFrame, frame_n, EST_BLAST_LEN);
        blastLen = endFrame - startFrame;
        for (int frame=0; frame<blastLen; frame++)
            relDeltaImages[frame] = cvCloneImage(bwMasks[frame + startFrame]);
        setAllHeights(relDeltaImages, allHeights, blastLen);
        CvMat* maxFrameHeights = cvCreateMat(2, ActualWidth, CV_32S);
        setNewAllMaxHeights( allHeights, maxFrameHeights);
        CvPoint blastOrigin = getBlastOrigin( relDeltaImages[0] );
        int roofCount = 0;
        bool roofing;
        int firtstFrameWithRoofing=blastLen, firstRoofingColumn = -1;
        int pixTop, pixFrame;
        for (int i=0; i<imgSz.width; i++)
        {
            pixTop = (int)cvGetReal2D( maxFrameHeights, 0, i );
            if( pixTop == imgSz.height )
            {
                roofCount++;
                pixFrame = (int)cvGetReal2D( maxFrameHeights, 1, i );
                if(pixFrame < firtstFrameWithRoofing)
                {
                    firtstFrameWithRoofing = pixFrame;
                    firstRoofingColumn = i;
                }
            }
        }
        if(roofCount > 1) roofing = true;
        else roofing = false;
        setGrScImageVect( images, relDeltaImages, deltaGSImages, blastLen, startFrame );
        setOFVectorsBMfromGSmask( images, deltaGSImages, blastLen, mvX, mvY, startFrame );
        int mvBlocks[EST_BLAST_LEN];
        CvPoint maxPos[EST_BLAST_LEN] = { 0, 0};
        heightResult outResult = traceExpansion( Actual Height, allHeights, startFrame, blastLen, firstRoofingColumn,
ActualHeight-blastOrigin.y, maxPos );
        analysisResult.heighInFeet = outResult.heightinFeet;
        if(outResult.reliability < 20 )
            analysisResult.correctness = -1;
        else if(outResult.reliability >= 20 && outResult.reliability <= 30 )
            analysisResult.correctness = 0;
        else analysisResult.correctness = 1;
        if(roofing == true ) analysisResult.roofing = 1;
        else analysisResult.roofing = 0;
#if DETECT_ORANGE_SMOKE // ############### Detect Orange smoke ####################### //
        bool orangeSmoke = DetectOrangeStuffMovements(images, frame_n, imgSz, fps);
        if( orangeSmoke == true )
            analysisResult.hasOrangeSmoke = 1;
        else
            analysisResult.hasOrangeSmoke = 0;
#endif
#if GENERATE_VIDEO // ############### Save Output Video ####################### //
```

```
    displayAndSaveOutVideoFile( images, mvX, mvY, mvBlocks, frame_n, startFrame, blastLen, maxPos, blastOrigin,
allHeights, exportPath, logfile );
#endif
    // ################################################################ //
    logfile << "I. " << getTime( ) << " - analysis finished for file " << fileAddr;
    logfile << ". Height: " << analysisResult.heighInFeet;
    logfile << "Roofing: " << analysisResult.roofing;
    logfile << "Correctness: " << analysisResult.correctness;
    logfile << "Quality of blast capture" << analysisResult.captureQuality <<endl;
    logfile << " OrangeSmoke: " << analysisResult.hasOrangeSmoke <<endl;
    logfile.close( );
    return analysisResult;
}
```

The following is a program for trace expansion.

```
heightResult traceExpansion( int imageHeight, CvMat* heights, int blastStartFrame, int numFrames, int ColumnWithErliesRoof,
int blstOriginY, CvPoint maxPos[ ] )
{
    int timeFrameCounter = 0;
    int startCount = 0;
    int deltaX, deltaY;
    int shiftY, shiftX;
    int numOfZeroRuns=0;
    bool roofPoint = false;
    bool iteration = false;
    float x[3], y[3];
    int point;
    parabCoef pc;
    lineCoef lc;
    int parX, parY;
    int goodParabolaMatch=0;
    int numOfVoidFrames = 0;
    float percOfVoidFrames;
    int centrColumn = ColumnWithErliesRoof;
    int searchLimitLeft = 8;
    int searchLimitRight = 8;
    int verticalPontCounter = 0;
    heightResult result;
    maxPos[numFrames-1] = getMaxHeightInFrame( heights, imageHeight, numFrames-1, centrColumn );
    if( maxPos[numFrames-1].x != -1 )
    {
        centrColumn = maxPos[numFrames-1].x;
        x[0] = (float)maxPos[numFrames-1].x;
        y[0] = (float)maxPos[numFrames-1].y;
        point = 1;
        shiftY=0;
        shiftX=0;
        if(maxPos[numFrames-1].y == imageHeight) { roofPoint = true; startCount = 1; }
    }
    else
    {
        result.heightinFeet = -1;
        result.reliability = -1;
        return result;
    }
    for (int i=numFrames-2; i>=0; i--)
    {
        maxPos[i] = getMaxHeightInFrame( heights, imageHeight, i , centrColumn, searchLimitLeft, searchLimitRight
);
        if(maxPos[i].x != -1)
        {
            centrColumn = maxPos[i].x;
            deltaY = maxPos[i+1].y - maxPos[i].y;
            deltaX = maxPos[i].x - maxPos[i+1].x;
    if ( deltaY > 0 )
            {
                if( deltaY <= 2 && numOfZeroRuns>10 && timeFrameCounter>numOfZeroRuns+1 &&
maxPos[i].y-blstOriginY < 20 ) break;
                roofPoint = false;
                iteration = false;
                startCount = 1;
```

```
            numOfZeroRuns = 0;
            shiftY += deltaY;
shiftX += deltaX;
            if(point==1)
            {
                    searchLimitLeft = 8;
                    searchLimitRight = 8;
            }
            else if( point==2 )
            {
               lc = getLinearCoef( x, y );
              if(lc.a > 0) { searchLimitLeft = 8; searchLimitRight = 3;}
                else { searchLimitRight = 8; searchLimitLeft = 3;}
            }
            else if( point==3 )
            {
                pc = getParabCoef( x, y );
                if(pc.a < 0 && pc.a > −1.0)
                {
                    point++;
                    searchLimitRight = searchLimitLeft = 8;
                  goodParabolaMatch = 1;
                }
                  else point = 2;
            }
            else if( point == 4 )
            {
  parX = maxPos[i].x;
                 parY = (int)(pc.a*parX*parX + pc.b*parX + pc.c);
                 if( abs(parY − maxPos[i].y) <= 5 )
                 {
                     goodParabolaMatch++;
                 }
                 if( abs(parY − maxPos[i].y) > 5 && abs(parY − maxPos[i].y) <= 15)
                 {
                     x[1] = x[2];
                     y[1] = y[2];
                     point = 2;
                 }
                 else if( abs(parY − maxPos[i].y) > 15 && goodParabolaMatch > 3 )
                 {
                     maxPos[i].x = maxPos[i].y = 0;
                     break;
                 }
            }
            if( point<3 && shiftY>2 )
            {
              if(shiftX != 0 )
              {
                x[point] = (float)maxPos[i].x;
                y[point] = (float)maxPos[i].y;
                point++;
                shiftY = 0;
                shiftX = 0;
                verticalPontCounter = 0;
              }
              else
              {
                if(++verticalPontCounter > 2)
                   { searchLimitRight = 3; searchLimitLeft = 3; }
              }
            }
         }
         else
         {
if( deltaY == 0 )
            {
               if (iteration == true ) iteration = false;
            }
            else if( deltaY == −1 )
            {
               maxPos[i].x = maxPos[i+1].x; maxPos[i].y = maxPos[i+1].y;
            }
```

```
            else if( deltaY < -1 )
            {
                i++;
                if(--searchLimitLeft < 0) searchLimitLeft = 0;
                if(--searchLimitRight < 0) searchLimitRight = 0;
                centrColumn = maxPos[i].x;
                iteration = true;
            }
            if( startCount == 1 && roofPoint == false && iteration == false)
            {
                numOfVoidFrames++;
                numOfZeroRuns++;
            }
        }
        if(startCount == 1 && iteration == false )
        {
            timeFrameCounter++;
        }
    }
    else break;
}
timeFrameCounter -= numOfZeroRuns;
numOfVoidFrames -= numOfZeroRuns;
if(timeFrameCounter > 4 && roofPoint == false)
{
    percOfVoidFrames = (float)numOfVoidFrames/(timeFrameCounter);
    result.heightinFeet = 0.5 + (timeFrameCounter/30.0)*(timeFrameCounter/30.0)*16.0;
    result.reliability = 100 - (int)(percOfVoidFrames*100.0);
}
else
{
    result.heightinFeet = -1;
    result.reliability = 0;
}
return result;
}
```

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software and/or firmware, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

The invention claimed is:

1. A method for analyzing blasting video data comprising a plurality of video frames, the method comprising:
   modeling background data using a first set of video frames corresponding to images before a blasting event;
   masking at least some of the plurality of video frames according to the modeled background data to generate foreground video data representing deviations from the modeled background data;
   using at least one processor, determining an origin frame corresponding to a first occurrence of foreground video data in the plurality of the video frames;
   identifying blast outline coordinates based on the foreground video data of a second set of video frames including the origin frame and plurality of subsequent video frames;
   determining a highest point reached by a highest identified blast particle based on the blast outline coordinates in the second set of video frames;
   determining a blast highest point frame corresponding to the determined highest point;
   estimating a linear or parabolic blast expansion trajectory associated with the identified highest blast particle based on the blast outline coordinates of the second set of video frames;
   determining an original location of the identified highest blast particle, and identifying an original frame at which the identified highest blast particle initially moved from the original location based on the blast expansion trajectory and the second set of video frames;
   determining a travel time representing the time between the original frame and the blast highest point frame according to a frame rate of the blasting video data;
   estimating a maximum height associated with the identified highest blast particle based on the determined travel time;
   generating overlay indicia for replay of the blasting video data based on at least one of the determined highest point, the estimated linear or parabolic blast expansion trajectory associated with the identified highest blast particle, the determined original location of the identified highest blast particle, and the estimated maximum height associated with the identified highest blast particle; and rendering the blasting video data on a graphical display together with the overlay indicia.

2. The method of claim 1, comprising estimating an initial blast velocity based on the estimated maximum height associated with the identified highest blast particle.

3. The method of claim 2, comprising modeling the background data with simulated camera vibration using the first set of video frames.

4. The method of claim 2, comprising categorizing correctness of the estimated maximum height.

5. The method of claim 2, comprising analyzing color of the second set of video frames to detect toxic smoke.

6. The method of claim 2, comprising:
estimating an unseen final location where the identified highest blast particle is assumed to have stopped rising based on the estimated blast expansion trajectory associated with the identified highest blast particle;
determining an additional travel time from a last identified location of the identified highest blast particle to the estimated final location based on the estimated blast expansion trajectory;
determining the blast highest point frame corresponding to the estimated final location and the estimated blast expansion trajectory;
determining the travel time representing the time between the original frame and the estimated final location according to the frame rate; and
estimating the maximum height associated with the identified highest blast particle based on the determined travel time.

7. The method of claim 1, comprising modeling the background data with simulated camera vibration using the first set of video frames.

8. The method of claim 1, comprising categorizing correctness of the estimated maximum height.

9. The method of claim 1, comprising analyzing color of the second set of video frames to detect toxic smoke.

10. The method of claim 1, comprising:
estimating an unseen final location where the identified highest blast particle is assumed to have stopped rising based on the estimated blast expansion trajectory associated with the identified highest blast particle;
determining an additional travel time from a last identified location of the identified highest blast particle to the estimated final location based on the estimated blast expansion trajectory;
determining the blast highest point frame corresponding to the estimated final location and the estimated blast expansion trajectory;
determining the travel time representing the time between the original frame and the estimated final location according to the frame rate; and
estimating the maximum height associated with the identified highest blast particle based on the determined travel time.

11. A system for analyzing blasting video data, comprising:
a processor programmed to:
model background data using a first set of video frames corresponding to images before a blasting event;
mask at least some of the plurality of video frames according to the modeled background data to generate foreground video data representing deviations from the modeled background data;
determine an origin frame corresponding to a first occurrence of foreground video data in the plurality of the video frames;
identify blast outline coordinates based on the foreground video data of a second set of video frames including the origin frame and plurality of subsequent video frames;
determine a highest point reached by a highest identified blast particle based on the blast outline coordinates in the second set of video frames;
determine a blast highest point frame corresponding to the determined highest point;
estimate a linear or parabolic blast expansion trajectory associated with the identified highest blast particle based on the blast outline coordinates of the second set of video frames;
determine an original location of the identified highest blast particle, and identifying an original frame at which the identified highest blast particle initially moved from the original location based on the blast expansion trajectory and the second set of video frames;
determine a travel time representing the time between the original frame and the blast highest point frame according to a frame rate of the blasting video data;
estimate a maximum height associated with the identified highest blast particle based on the determined travel time;
generate overlay indicia for replay of the blasting video data based on at least one of a determined highest point, an estimated linear or parabolic blast expansion trajectory associated with the identified highest blast particle, a determined original location of the identified highest blast particle, and an estimated maximum height associated with the identified highest blast particle; and
render the blasting video data on a graphical display together with the overlay indicia.

12. A non-transitory computer readable medium with computer executable instructions for analyzing blasting video data, the computer readable medium comprising computer executable instructions for:
modeling background data using a first set of video frames corresponding to images before a blasting event;
masking at least some of the plurality of video frames according to the modeled background data to generate foreground video data representing deviations from the modeled background data;
using at least one processor, determining an origin frame corresponding to a first occurrence of foreground video data in the plurality of the video frames;
identifying blast outline coordinates based on the foreground video data of a second set of video frames including the origin frame and plurality of subsequent video frames;
determining a highest point reached by a highest identified blast particle based on the blast outline coordinates in the second set of video frames;
determining a blast highest point frame corresponding to the determined highest point;
estimating a linear or parabolic blast expansion trajectory associated with the identified highest blast particle based on the blast outline coordinates of the second set of video frames;

determining an original location of the identified highest blast particle, and identifying an original frame at which the identified highest blast particle initially moved from the original location based on the blast expansion trajectory and the second set of video frames;

determining a travel time representing the time between the original frame and the blast highest point frame according to a frame rate of the blasting video data;

estimating a maximum height associated with the identified highest blast particle based on the determined travel time;

generating overlay indicia for replay of the blasting video data based on at least one of the determined highest point, the estimated linear or parabolic blast expansion trajectory associated with the identified highest blast particle, the determined original location of the identified highest blast particle, and the estimated maximum height associated with the identified highest blast particle; and rendering the blasting video data on a graphical display together with the overlay indicia.

13. The computer readable medium of claim 12, comprising computer executable instructions for estimating an initial blast velocity based on the estimated maximum height associated with the identified highest blast particle.

14. The computer readable medium of claim 12, comprising computer executable instructions for modeling the background data with simulated camera vibration using the first set of video frames.

15. The computer readable medium of claim 12, comprising computer executable instructions for categorizing correctness of the estimated maximum height.

16. The computer readable medium of claim 12, comprising computer executable instructions for analyzing color of the second set of video frames to detect toxic smoke.

17. The computer readable medium of claim 12, comprising computer executable instructions for:

estimating an unseen final location where the identified highest blast particle is assumed to have stopped rising based on the estimated blast expansion trajectory associated with the identified highest blast particle;

determining an additional travel time from a last identified location of the identified highest blast particle to the estimated final location based on the estimated blast expansion trajectory;

determining the blast highest point frame corresponding to the estimated final location and the estimated blast expansion trajectory;

determining the travel time representing the time between the original frame and the estimated final location according to the frame rate; and estimating the maximum height associated with the identified highest blast particle based on the determined travel time.

* * * * *